United States Patent
Yun et al.

(10) Patent No.: US 8,626,211 B2
(45) Date of Patent: *Jan. 7, 2014

(54) MOBILE TERMINAL AND CONTROLLING METHOD THEREOF

(75) Inventors: Yeerang Yun, Seoul (KR); Sungyoung Yoon, Seoul (KR); Byungsang Yeo, Seoul (KR); Jiyoun Lee, Seoul (KR); Jinwoo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,042

(22) Filed: Aug. 24, 2012

(65) Prior Publication Data

US 2013/0122944 A1    May 16, 2013

(30) Foreign Application Priority Data

Nov. 11, 2011    (KR) .................. 10-2011-0117330

(51) Int. Cl.
*H04M 1/00*    (2006.01)
*H04M 11/00*   (2006.01)
*H04B 1/38*    (2006.01)
*G09G 5/00*    (2006.01)

(52) U.S. Cl.
USPC ........ 455/466; 455/550.1; 455/566; 345/634; 379/93.23

(58) Field of Classification Search
USPC ............... 340/539.1, 539.25; 345/4; 455/466, 455/566, 550.1; 709/206; 725/109
See application file for complete search history.

(56) References Cited

U.S. PATENT DOCUMENTS

| | | | | |
|---|---|---|---|---|
| 6,069,648 A | * | 5/2000 | Suso et al. | 348/14.02 |
| 2004/0092284 A1 | * | 5/2004 | Satoh et al. | 455/550.1 |
| 2006/0277266 A1 | * | 12/2006 | Kim et al. | 709/206 |
| 2007/0035616 A1 | * | 2/2007 | Lee et al. | 348/14.16 |
| 2007/0115109 A1 | * | 5/2007 | Turney et al. | 340/506 |
| 2007/0275762 A1 | * | 11/2007 | Aaltone et al. | 455/566 |
| 2007/0291107 A1 | * | 12/2007 | Kang | 348/14.01 |
| 2007/0296739 A1 | * | 12/2007 | Lonn | 345/634 |
| 2010/0057466 A1 | * | 3/2010 | Garg et al. | 704/260 |
| 2011/0047487 A1 | * | 2/2011 | DeWeese et al. | 715/758 |

FOREIGN PATENT DOCUMENTS

WO    WO 0193590    * 12/2001

* cited by examiner

*Primary Examiner* — Nizar Sivji
(74) *Attorney, Agent, or Firm* — KED & Associates LLP

(57) ABSTRACT

A mobile terminal and controlling method thereof are disclosed. The present invention includes an A/V input unit receiving an input of a surrounding image via an image sensor, a display unit, a wireless communication unit, a memory recording an image inputted by real time via the camera as a real-time taken data, and a controller controlling the real-time taken data to be outputted to the display unit, the controller controlling the wireless communication unit to relay the real-time taken data to at least one external terminal by real time, the controller controlling the display unit to display a $1^{st}$ type message related to the real-time taken data and a $2^{nd}$ type message not related to the real-time taken data in a manner that the $1^{st}$ type message and the $2^{nd}$ type message are visually discriminated from each other.

8 Claims, 34 Drawing Sheets

MOBILE TERMINAL AND CONTROLLING METHOD THEREOF

CROSS-REFERENCE TO RELATED APPLICATION(S)

Pursuant to 35 U.S.C. §119(a), this application claims the benefit of earlier filing date and right of priority to Korean Application No. 10-2011-0117330, filed on Nov. 11, 2011, the contents of which are hereby incorporated by reference herein in their entirety.

BACKGROUND

1. Field

The present invention relates to a mobile terminal, and more particularly, to a mobile terminal and controlling method thereof. Although the present invention is suitable for a wide scope of applications, it is particularly suitable for relaying a taken-image by real time.

2. Background

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

A mobile terminal performs an inter-terminal communication through a messaging service. For instance, the message service may be categorized into SMS (short message service), LMS (long message service) and MMS (multimedia message service). The MMS may mean a messaging service capable of attaching various kinds of multimedia files such as image files, music files, video files, audio files and the like, whereas the SMS or LMS is a text based messaging service.

Although a related art messaging service enables a transmission of a photographing-completed video file to a prescribed external terminal, it is unable to transmit a taken image by real time to a prescribed external terminal.

An instant messaging service, which provides a messaging environment equal to a computing environment, is coming into wide use together with a smart phone. However, it may be still impossible for the instant messaging service to transmit a taken image by real time to a prescribed external terminal.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a message service different from conventional message services can be provided.

Another object of the present invention is to provide a mobile terminal and controlling method thereof, by which an image taken by real time by the mobile terminal can be relayed live to an external terminal.

Another object of the present invention is to provide a mobile terminal and controlling method thereof, by which a user can be provided with visual convenience in a manner that a message transmitted/received to/from an external terminal is set to be visually discriminated from other messages in the course of relaying a real-time taken image.

A further object of the present invention is to provide a system, by which a taken image can be relayed by real time despite that an operating system of a mobile terminal is different from that of an external terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention may include a camera receiving an input of a surrounding image, a display unit, a wireless communication unit, a memory recording an image inputted by real time via the camera as a real-time taken data, and a controller controlling the real-time taken data to be outputted to the display unit, the controller controlling the wireless communication unit to relay the real-time taken data to at least one external terminal by real time, the controller controlling the display unit to display a $1^{st}$ type message related to the real-time taken data and a $2^{nd}$ type message not related to the real-time taken data in a manner that the $1^{st}$ type message and the $2^{nd}$ type message are visually discriminated from each other.

In another aspect of the present invention, a method of controlling a mobile terminal may include a $1^{st}$ step of activating an A/V (audio/video) input unit, a $2^{nd}$ step of relaying a real-time taken data inputted by real time via the A/V input unit to an external terminal, and a $3^{rd}$ step of displaying the real-time taken data inputted by real time via the A/V input unit, a $1^{st}$ type message related to the real-time taken data and a $2^{nd}$ type message not related to the real-time taken data in a manner that the $1^{st}$ type message and the $2^{nd}$ type message are visually discriminated from each other.

In a further aspect of the present invention, a computer-readable recording medium may include a program recorded therein to control a mobile terminal, the program including a command to activate an A/V (audio/video) input unit, a command to relay a real-time taken data inputted by real time via the A/V input unit to an external terminal, and a command to display the real-time taken data inputted by real time via the A/V input unit, a $1^{st}$ type message related to the real-time taken data and a $2^{nd}$ type message not related to the real-time taken data in a manner that the $1^{st}$ type message and the $2^{nd}$ type message are visually discriminated from each other.

Accordingly, the present invention provides the following effects and/or advantages.

First of all, a mobile terminal according to at least one embodiment of the present invention may be able to relay a taken image of surroundings to an external terminal by real time.

Secondly, the present invention may provide a user with visual convenience in a manner that a message transmitted/received to/from an external terminal is set to be visually discriminated from other messages in the course of relaying a real-time taken image.

Thirdly, the present invention may be able to relay a taken image by real time despite that an operating system of a mobile terminal is different from that of an external terminal.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The embodiments will be described in detail with reference to the following drawings in which like reference numerals refer to like elements wherein.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
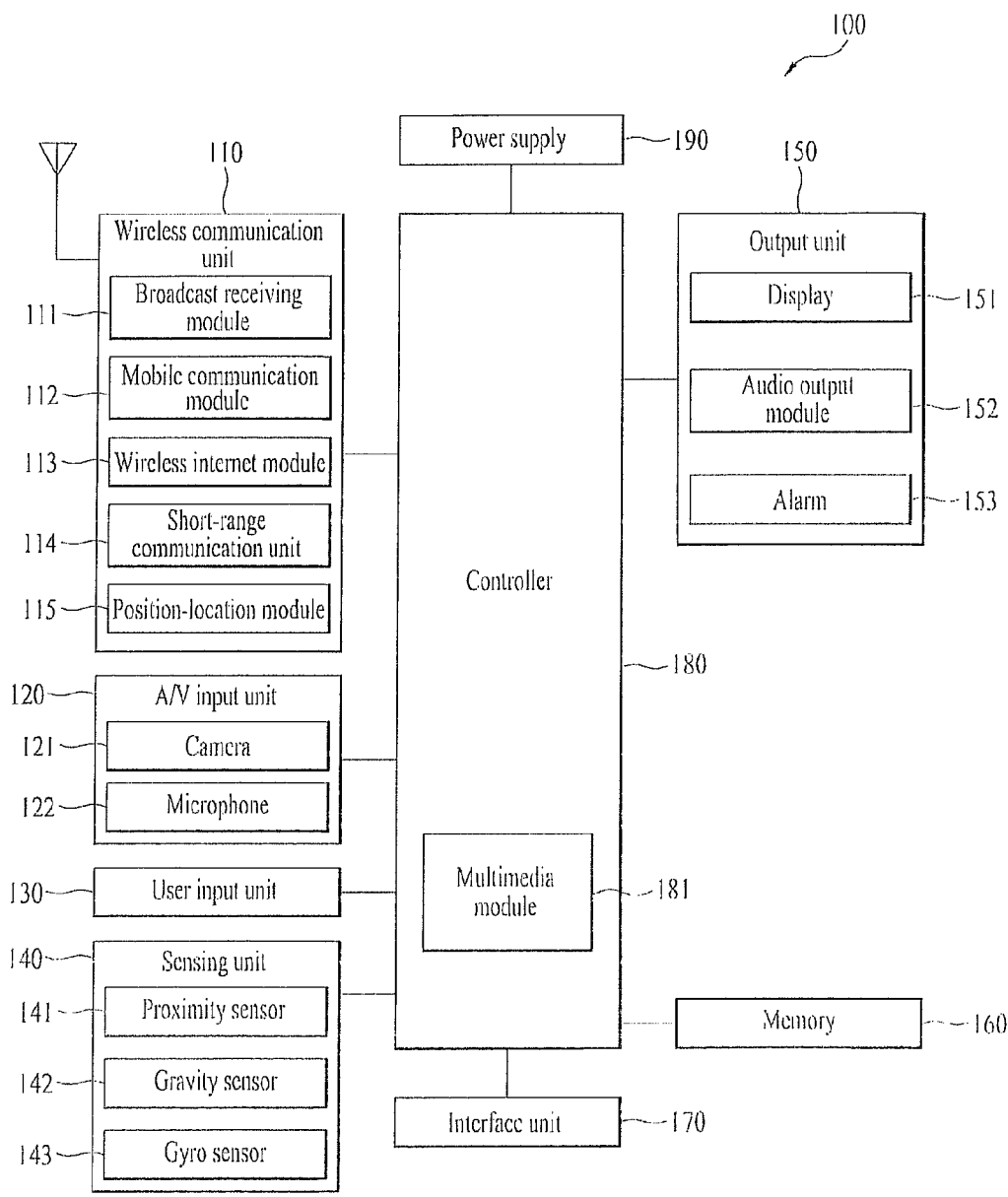
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (NV) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
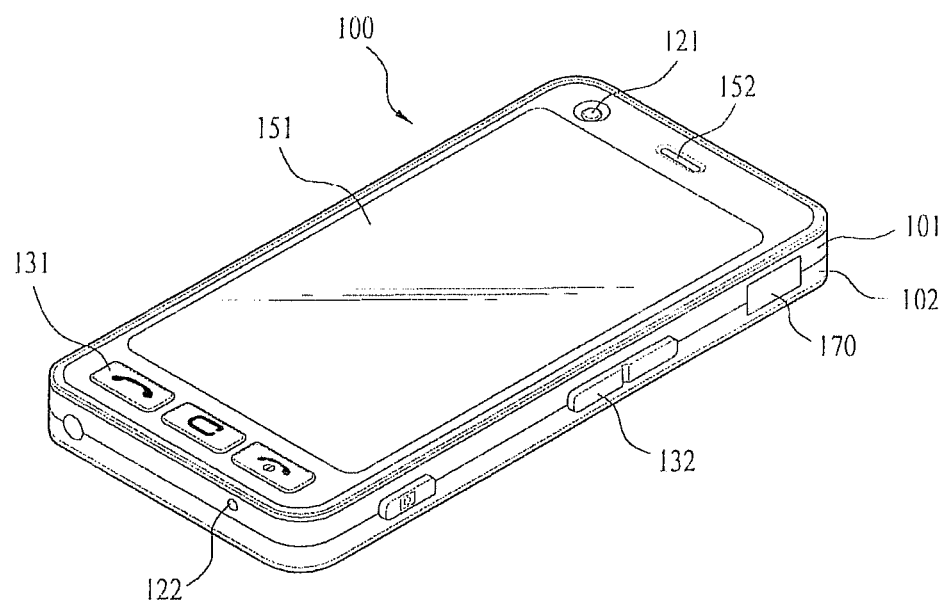
FIG. 2 is a front perspective diagram of a mobile or handheld terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

For clarity and convenience of the following description, assume that a mobile terminal mentioned in the following description may include at least one of the components shown in FIG. 1. In particular, a mobile terminal according to the present invention may include an A/V input unit 120, a wireless communication unit 110, a memory 160, a display unit 151 and a controller 180.

The A/V input unit 120 may be able to receive an input of a surrounding image through an image sensor of a camera 121. The A/V input unit 120 may be activated by the controller 180. In this case, the controller 180 may be able to determine whether to activate the A/V input unit 120 based on an external input.

The controller 180 processes an image inputted by real time through the A/V input unit 120 into a real-time taken data and then saves the corresponding data in the memory 160. And, the controller 180 may be able to control the real-time taken data saved in the memory 160 to be displayed on the display unit 151.

The controller 180 may be able to control the wireless communication unit 110 to relay the real-time taken data to at least one external terminal by real time. In particular, the controller 180 may be able to control the wireless communication unit 110 to transmit the real-time taken data to the external terminal.

In doing so, the controller 180 may be able to control the display unit 151 to display a $1^{st}$ type message related to the real-time taken data and a $2^{nd}$ type message having no relation with the real-time taken data in a manner that the $1^{st}$ type message and the $2^{nd}$ type message are visually discriminated from each other.

Figure 3:
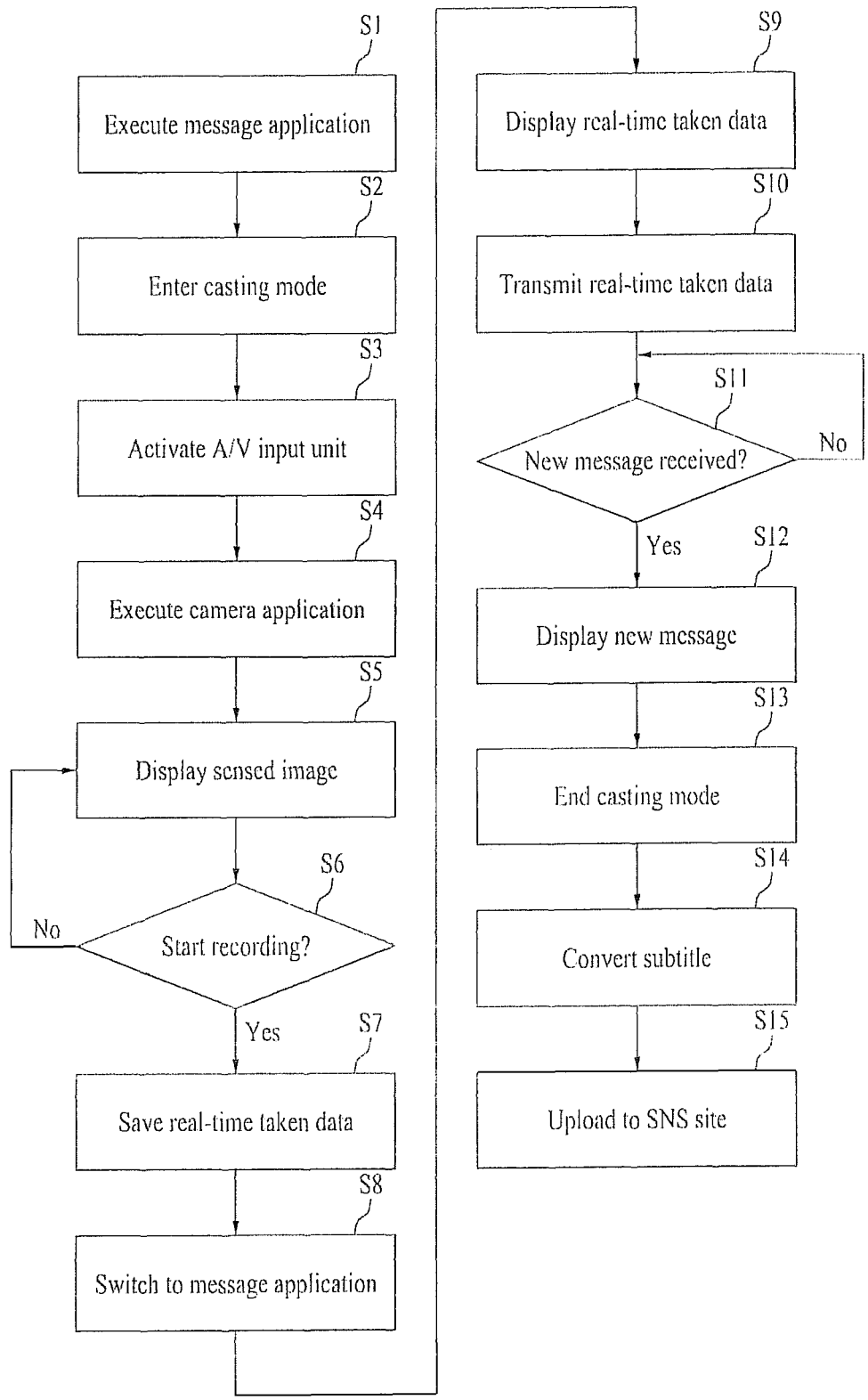
FIG. 3 is a flowchart for a method of controlling a mobile terminal according to one embodiment of the present invention.

FIG. 3 is a flowchart for a method of controlling a mobile terminal according to one embodiment of the present invention.

Referring to FIG. 3, the controller 180 executes a message application [S1] and then controls the display unit 151 to display a screen related to the message module.

Figure 4A:
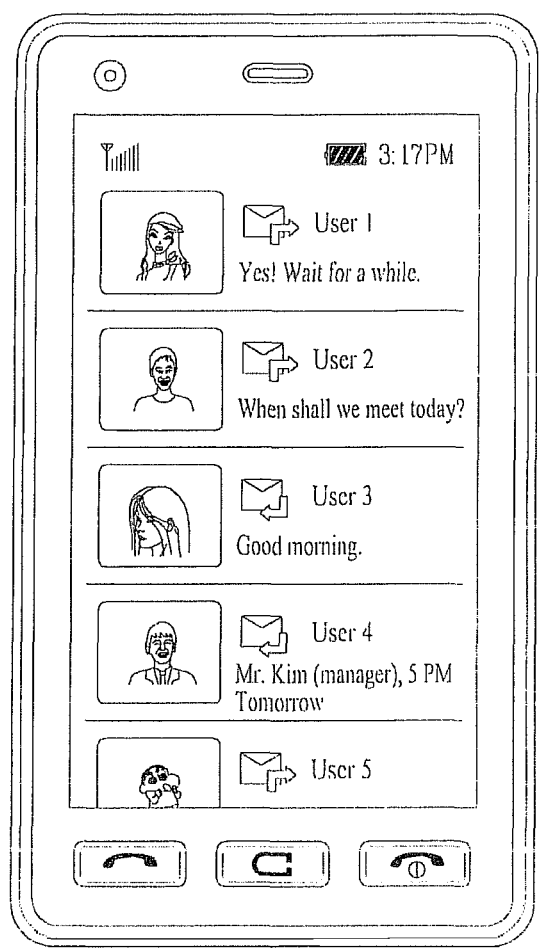
FIG. 4A and FIG. 4B are diagrams for examples of a screen related to a message module provided to a user.
Figure 4B:
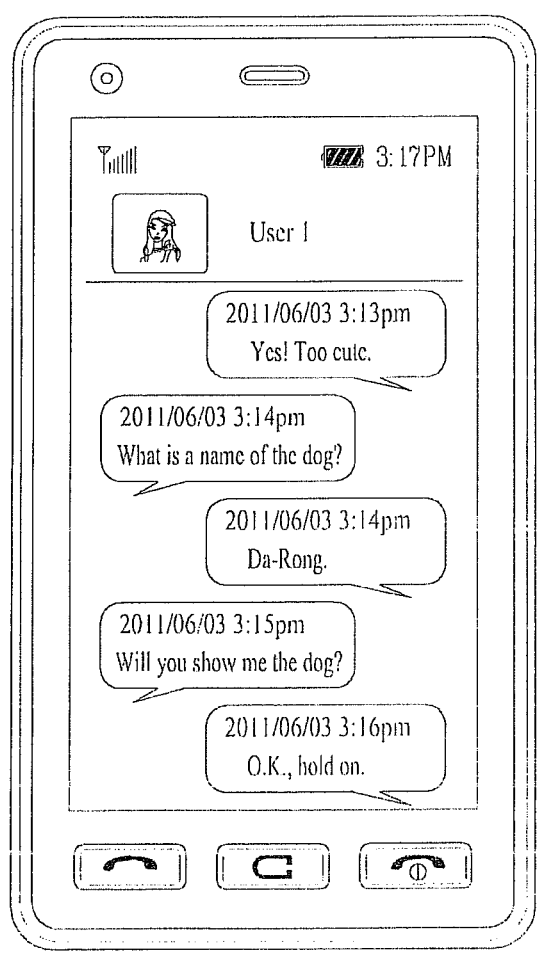

FIG. 4A and FIG. 4B are diagrams for examples of a screen related to a message application provided to a user. Referring to FIG. 4A and FIG. 4B, the controller 180 sorts a plurality of messages transceived with a plurality of external terminals by at least one of a phone number, a counterpart name and an email address and may be then able to display the sorted messages on the display unit. In particular, FIG. 4A is a diagram for one example of an output for sorting messages by a counterpart. If a user selects a specific counterpart from the screen provided as the example shown in FIG. 4A, the controller 180 may be able to control contents of the messages transceived with the selected counterpart (e.g., an external terminal of the selected counterpart) to be displayed in detail [FIG. 4B].

If the user selects a particular counterpart and then enters the screen shown in FIG. 4B, the controller 180 may be able to control the display unit 151 to display an icon 11 for setting whether to enter a casting mode for relaying real-time taken data to the external terminal of the selected counterpart.

Figure 5A:
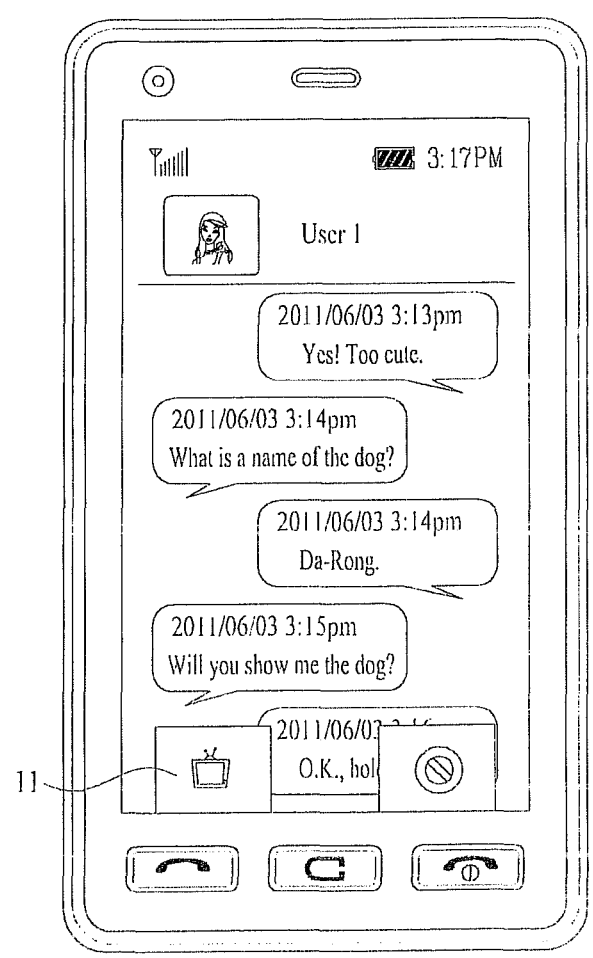
FIG. 5A and FIG. 5B are diagrams for output examples of a display unit provided to a user to enter a casting mode.
Figure 5B:
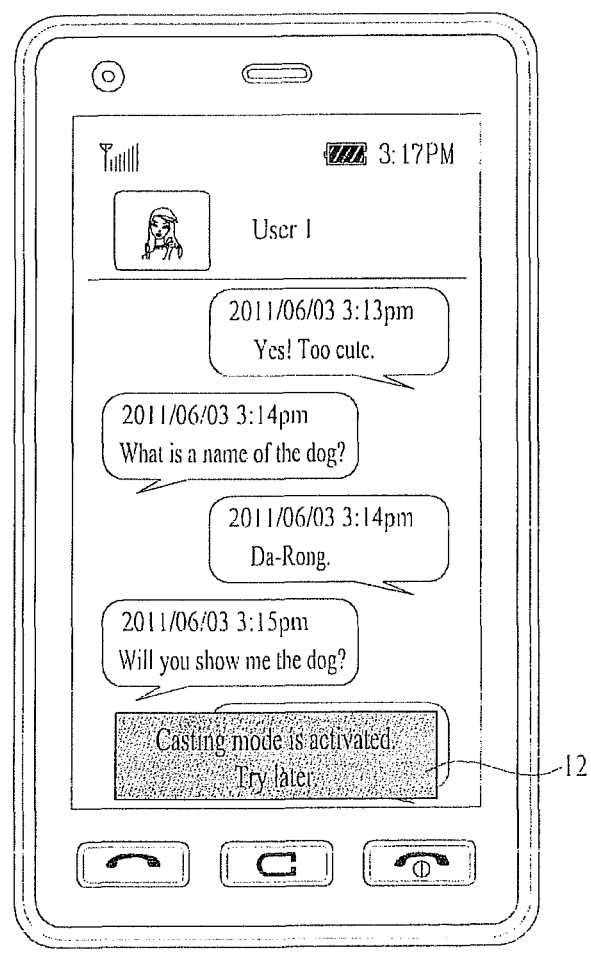

FIG. 5A and FIG. 5B are diagrams for output examples of a display unit provided to a user to enter a casting mode. Referring to FIG. 5A, the controller 180 may be able to provide an icon 11 for determining whether to enter a casting mode. Yet, when the icon 11 is selected, if the casting mode is already active or the casting mode is active in an external terminal, referring to FIG. 5B, the controller 180 controls the display unit to output a toast message 12 to notify that the casting mode is not executable.

For instance, the controller 180 may be able to enter the casting mode by inputting the icon 11 shown in FIG. 5A [S2]. When the casting mode is entered, the controller 180 activates the A/V input unit 120 [S3], executes the camera application [S4], and may be then able to control the display unit 151 to display a screen related to the camera application and an image sensed by an image sensor of the camera 121 [S5].

Figure 6:
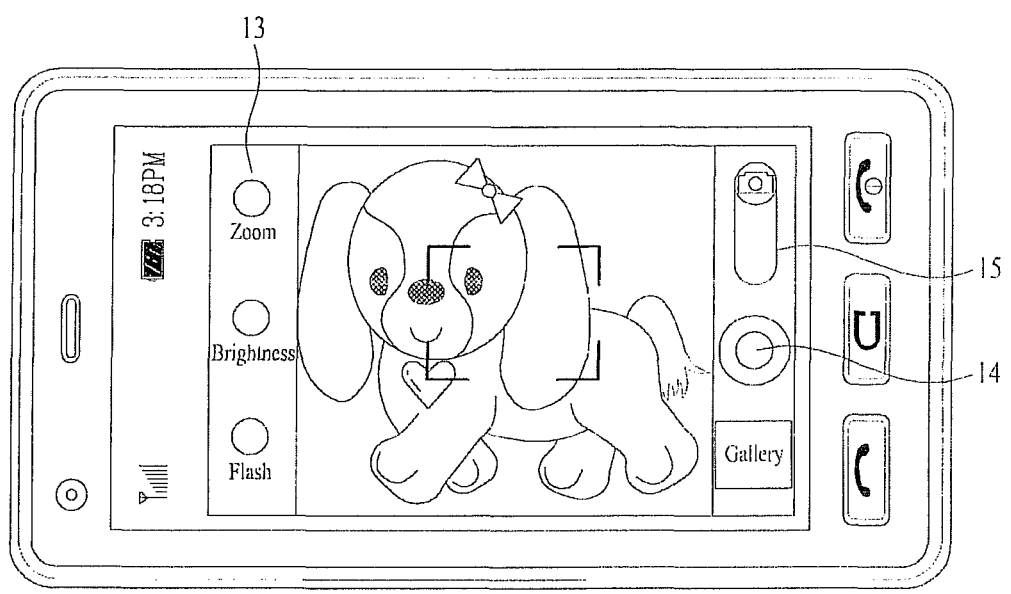
FIG. 6 is a diagram for one example of a screen related to a camera module provided to a user.

FIG. 6 is a diagram for one example of a screen related to a camera application provided to a user. Referring to FIG. 6, if the camera application is executed, the controller 180 displays an image inputted via the A/V input unit 120 and may be then able to display a menu screen 13 for adjusting items related to the camera 121 and a recording button 14. For instance, referring to FIG. 6, it may be able to provide the menu screen 13 for setting On/Off of a flash, a photographing brightness, a zoom of a camera lens and the like. Moreover, the controller 180 may be able to provide a menu for setting ISO, photographing resolution and the like. In case that at least two cameras are provided to a mobile terminal, it may be able to provide a menu for determining which camera will be used for photographing.

When a recording is started by pressing the recording button 14 [S6], the controller 180 creates a real-time taken data based on the image inputted via the A/V input unit 120 and may be then able to save the real-time taken data in the memory 160 (e.g., a volatile memory, a non-volatile memory, etc.) temporarily or permanently [S7]. Preferably, the real-time taken data saved in the memory 160 may have a streaming playable file format, by which the real-time taken data may be non-limited. In particular, the real-time taken data may be saved using such a streaming available extension as .wmv, .mp4, .flv, .asf and the like, by which the real-time taken data may be non-limited.

Once the recording is started, the controller 180 controls the output of the display unit 151 to switch to a message application activated screen [S8] and controls the display unit 151 to display a real-time taken data [S9]. In doing so, the controller 180 controls the display unit 151 to display the real-time taken data on a $1^{st}$ region of the display unit 151 and also controls the display unit 151 to output a message (e.g., a $1^{st}$ type message explained later in this description) transceived with an external terminal during a casting mode to a $2^{nd}$ region different from the $1^{st}$ region.

In this case, the controller 180 may set the real-time taken data to be displayed by being fixed to the $1^{st}$ region during the casting mode, by which the real-time taken data 180 may be non-limited. For instance, the real-time taken data may be set to be displayed on another region deviating from the $1^{st}$ region.

When the real-time taken data is displayed on the $1^{st}$ region, the controller 180 may control the display unit 151 to display the $2^{nd}$ region, which is different from the $1^{st}$ region, as an empty screen or may control the display unit 151 to display a message (e.g., a $2^{nd}$ type message explained later in this description) transceived with an external terminal, which was selected before the real-time taken data is relayed, on the $2^{nd}$ region.

Figure 7A:
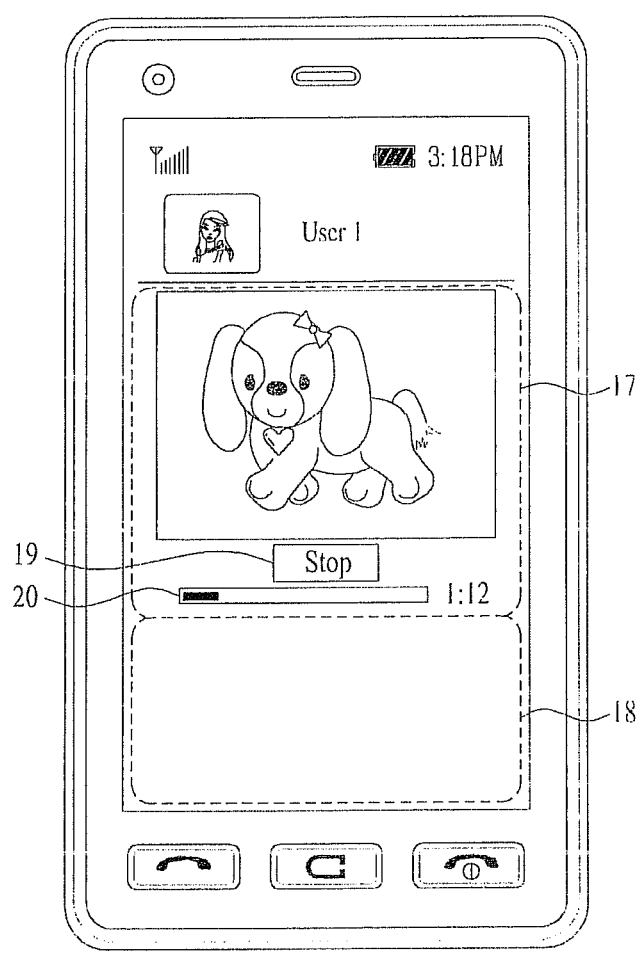
FIG. 7A and FIG. 7B are diagrams for output examples of a display unit to describe $1^{st}$ and $2^{nd}$ regions of the display unit.
Figure 7B:
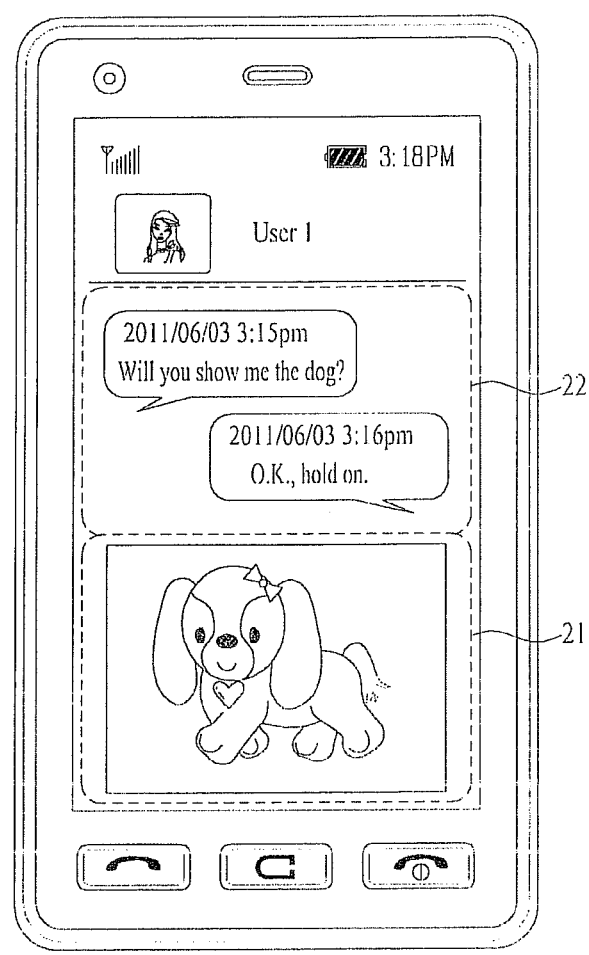

FIG. 7A and FIG. 7B are diagrams for output examples of a display unit to describe $1^{st}$ and $2^{nd}$ regions of the display unit. Referring to FIG. 7A and FIG. 7B, the controller 180 may configure a $1^{st}$ region 17/21 and a $2^{nd}$ region 18/22 in a manner of partitioning the display unit into a top part and a bottom part. Referring to FIG. 7A, the controller 180 displays a real-time taken data on the $1^{st}$ region 17 of the display unit and also displays an empty screen on the $2^{nd}$ region 18, thereby controlling a message, which is transceived with an external terminal during the casting mode, to be displayed on the $2^{nd}$ region 18. Referring to FIG. 7B, the controller 180 displays a real-time taken data on the $1^{st}$ region 21 and controls a message (e.g., a $2^{nd}$ type message explained later in this description), which was transceived with an external terminal before the casting mode is entered, to be outputted to the $2^{nd}$ region 22.

Furthermore, referring to FIG. 7A, the controller 180 may be able to further provide a button (e.g., a stop button) 19 for ending the casting mode and a progressing bar 20 indicating a video recordable time on the basis of a remaining storage capacity of the memory 160 as well as the real-time taken data.

FIG. 7A and FIG. 7B describe that the display unit is partitioned in to 2 regions, by which the present invention is non-limited. Alternatively, the display unit is partitioned into at least 3 regions including $1^{st}$ to $3^{rd}$ regions. In particular, a real-time taken data may be displayed on the $1^{st}$ region, an empty screen may be displayed on the $2^{nd}$ region, and a message (e.g., a $2^{nd}$ type message explained later in this description) transceived with an external terminal before the casting mode entry may be displayed on the $3^{rd}$ region.

The controller 180 transmits the real-time taken data to the selected external terminal and may control the transmitted real-time taken data to be played in the external terminal [S10]. In particular, the controller 180 partitions the real-time taken data into a plurality of data blocks, transmits the data blocks to the external terminal in order via the wireless communication unit 11, and controls the real-time taken data to be played in the selected external terminal by streaming.

According to the present embodiment, after a single external terminal has been selected, the controller 180 transmits real-time taken data by unicast, by which the present invention may be non-limited. Alternatively, a plurality of external terminals is selected or an external terminal is added during the casting mode, and real-time taken data is then controlled to be transmitted by multicast.

Figure 8A:
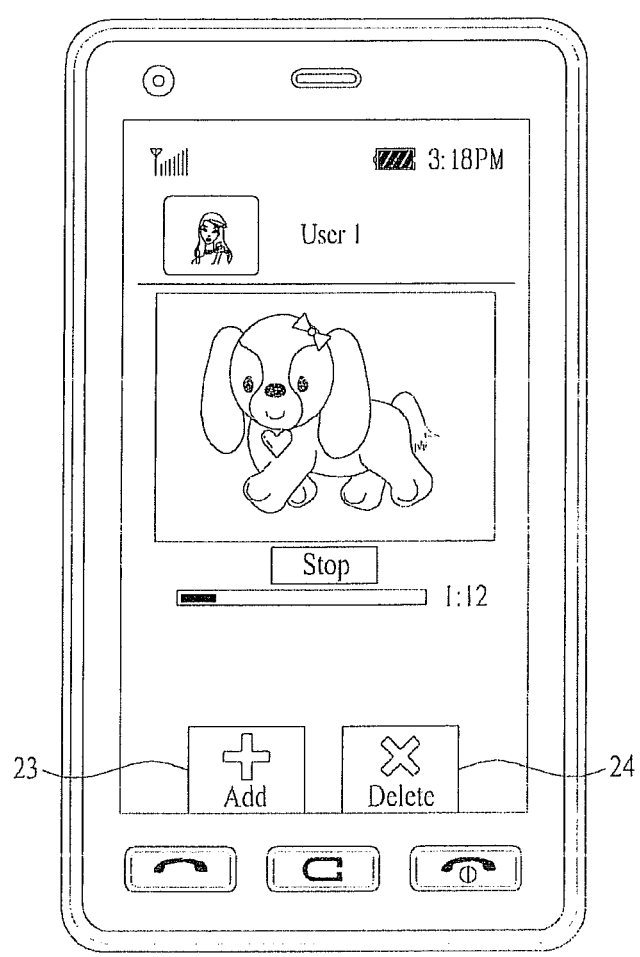
FIGS. 8A to 8C are diagrams for output examples of a display unit provided to a user to add an external terminal.
Figure 8B:
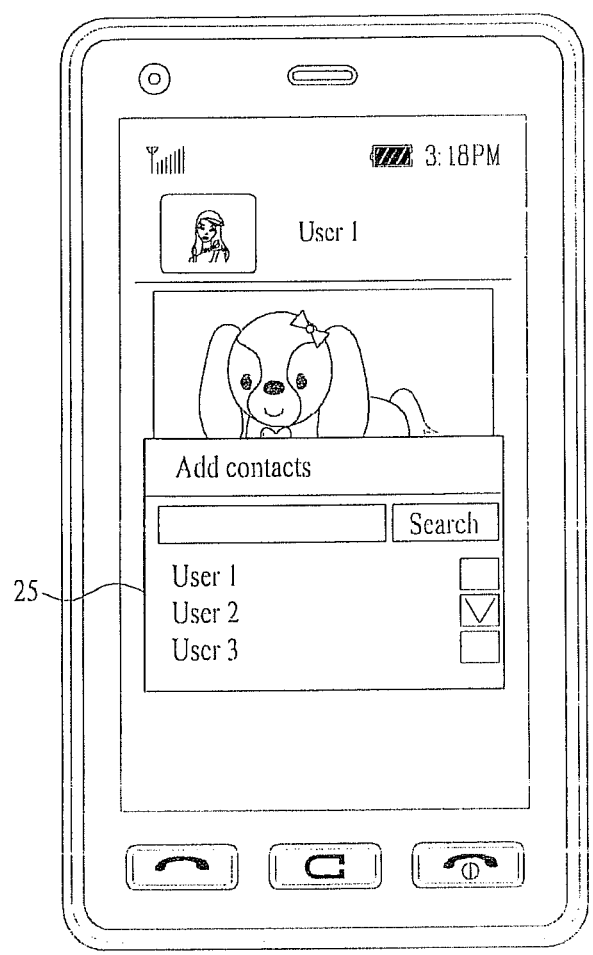
Figure 8C:
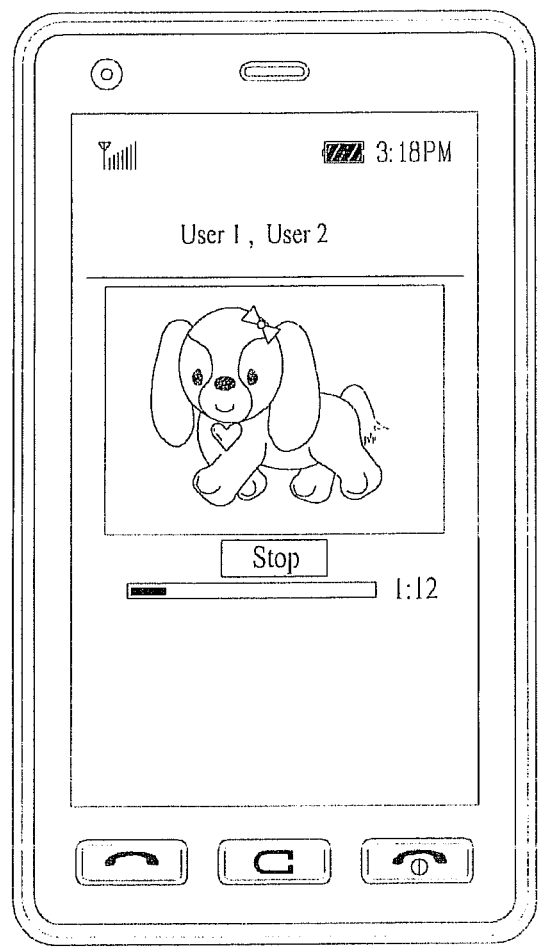

FIGS. 8A to 8C are diagrams for output examples of a display unit provided to a user to add an external terminal.

Referring to FIGS. 8A to 8C, while a real-time taken data is transmitted to a single external terminal (user 1) via the wireless communication unit 110, if a user presses a button (Add) to add an external terminal [FIG. 8A], the controller 180 may be able to provide a popup 25 for selecting an external terminal to add [FIG. 8B]. If the user selects a particular external terminal, the controller 180 may be able to control the wireless communication unit 110 to transmit the real-time taken data to a plurality of the external terminals (user 1, user 2) [FIG. 8C].

On the other hand, while real-time taken data is transmitted to a plurality of external terminals, if a user selects a button (Delete) 24 to delete an external terminal, the controller 180 deletes the selected external terminal from a real-time taken data transmission list and controls the real-time taken data not to be transmitted to the deleted external terminal.

While the casting mode is active or the real-time taken data is relay to the external terminal, if a new message is transmitted/received to/from the external terminal [S11], the controller 180 may control the display unit 151 to display the new message [S12].

In doing so, the controller 180 may be able to control the new message to be displayed on the $2^{nd}$ region of the display unit 151. Moreover, the controller 180 may be able to control an output of the display unit 151 in a manner that a message (hereinafter named a $1^{st}$ type message) transmitted/received to/from the external terminal in the course of an operation in the casting mode or relaying the real-time taken data to the external terminal and a $2^{nd}$ type message (e.g., a message transceived with the external terminal before a casting mode entry or after a casting mode end, a message transceived with the external terminal having the real-time taken data not transmitted thereto, etc.) different from the $1^{st}$ type message are visually discriminated from each other.

Figure 9A:
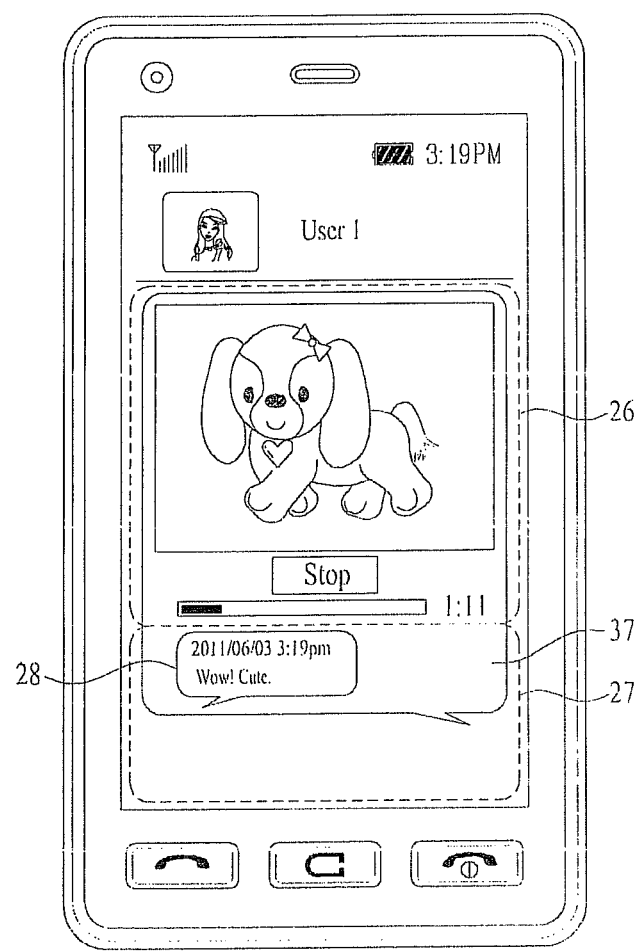
FIGS. 9A to 9C are diagrams for output examples of a display unit to describe that a $1^{st}$ type message is displayed.
Figure 9B:
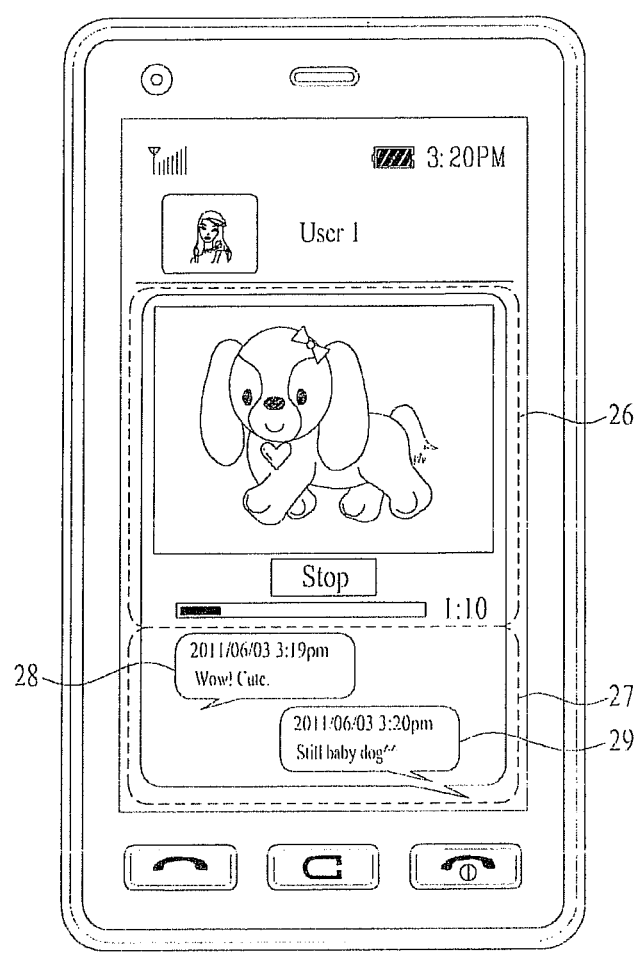
Figure 9C:
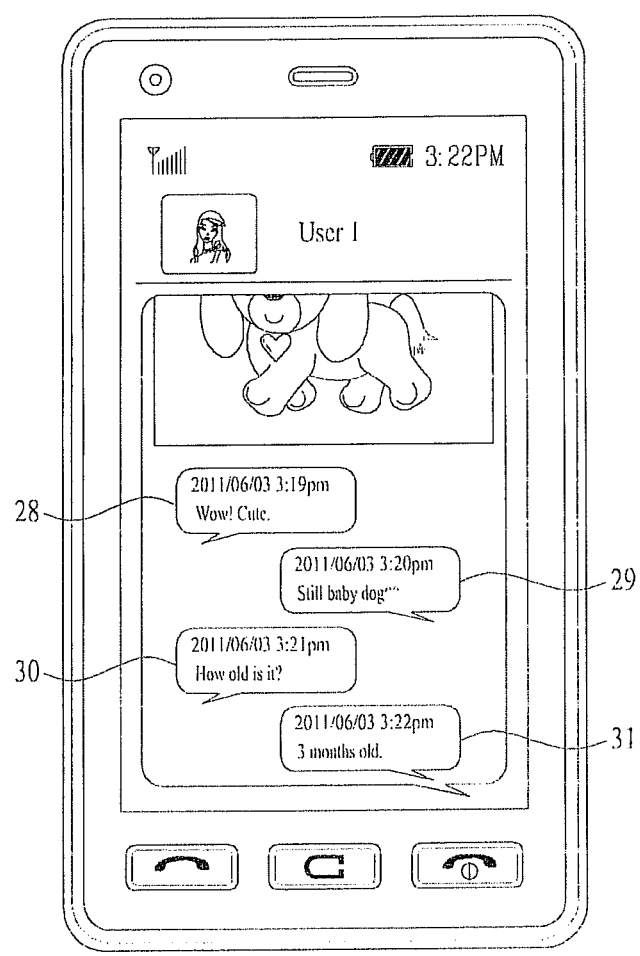

FIGS. 9A to 9C are diagrams for output examples of a display unit to describe that a $1^{st}$ type message is displayed. Referring to FIGS. 9A to 9C, while a casting mode is activated, if a new message 28 categorized into a $1^{st}$ type message is received, the controller 180 may be able to control the new message to be outputted to a $2^{nd}$ region 27 [FIG. 9A]. If a received/transmitted count of new messages is plural, the controller 180 arranges $1^{st}$ type messages 28 and 29 in time order and then controls the arranged messages to be displayed on the $2^{nd}$ region 27 in order of recent messages [FIG. 9B]. In doing so, in order to check the $1^{st}$ type message not displayed on the $2^{nd}$ region 27, the controller 180 may be able to limitedly provide a scroll function to the $2^{nd}$ region 27. A user may be able to check the $1^{st}$ type message by scrolling the $2^{nd}$ region 27 in a vertical (or horizontal) direction. By providing the scroll function to the $2^{nd}$ region 27 limitedly, the real-time taken data may be displayed on the $1^{st}$ region by being fixed thereto and a user may be able to check the $1^{st}$ type message, which is not displayed on the screen in a manner of shifting the $1^{st}$ type message displayed on the $2^{nd}$ region 27 in the vertical (or horizontal) direction.

Once the casting mode is ended, referring to FIG. 9C, the controller 180 releases the real-time taken data from being fixed to the $1^{st}$ region and also cancels the scroll function from the $2^{nd}$ region, thereby controlling the display unit 151 to display the $1^{st}$ type messages 28 to 31 to be displayed across the $1^{st}$ region and the $2^{nd}$ region.

In order to check the $2^{nd}$ type message failing to be displayed on the screen, the controller 180 may be able to provide a scroll function to shift both of the $1^{st}$ region and the $2^{nd}$ region in a vertical (or horizontal) direction. In doing so, if the real-time taken data deviates from the $1^{st}$ region due to the scroll, the controller 180 may be able to control the real-time taken data to be automatically shifted to another position spaced apart in a prescribed distance from a boundary of the $1^{st}$ region.

FIGS. 10A to 10D are diagrams for examples to describe a controlling method in case that real-time taken data deviates from a $1^{st}$ region. As mentioned in the foregoing description of the example shown in FIG. 9B, while a real-time taken data is displayed on a $1^{st}$ region 26 and a $1^{st}$ type messages 28 and 29 are provided to a $2^{nd}$ region, if a whole screen is shifted to make the real-time taken data deviate from the $1^{st}$ region 26, as described in the example shown in FIG. 10A, the controller 180 may be able to control the real-time taken data to be automatically shifted to another position (e.g., a bottom part of the display unit 151 shown in FIG. 10B) spaced apart in a prescribed distance from a boundary of the $1^{st}$ region 26. In case that the real-time taken data deviates from the $1^{st}$ region 26, the controller 180 may be able to control an output of the display unit 151 to display $2^{nd}$ type messages 32 to 34 on the $1^{st}$ region 26.

Figure 10A:
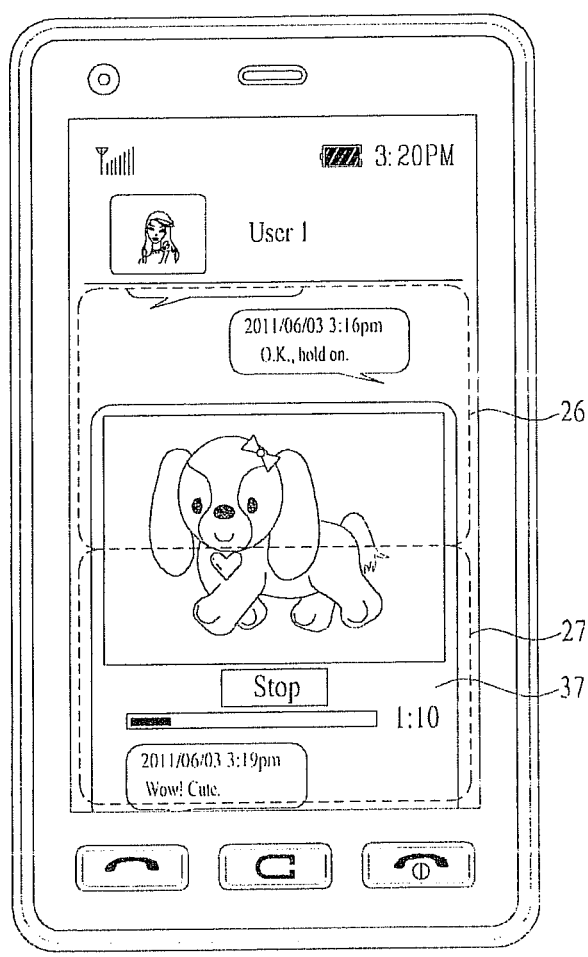
FIGS. 10A to 10D are diagrams for examples to describe a controlling method in case that real-time taken data deviates from a $1^{st}$ region.
Figure 10B:
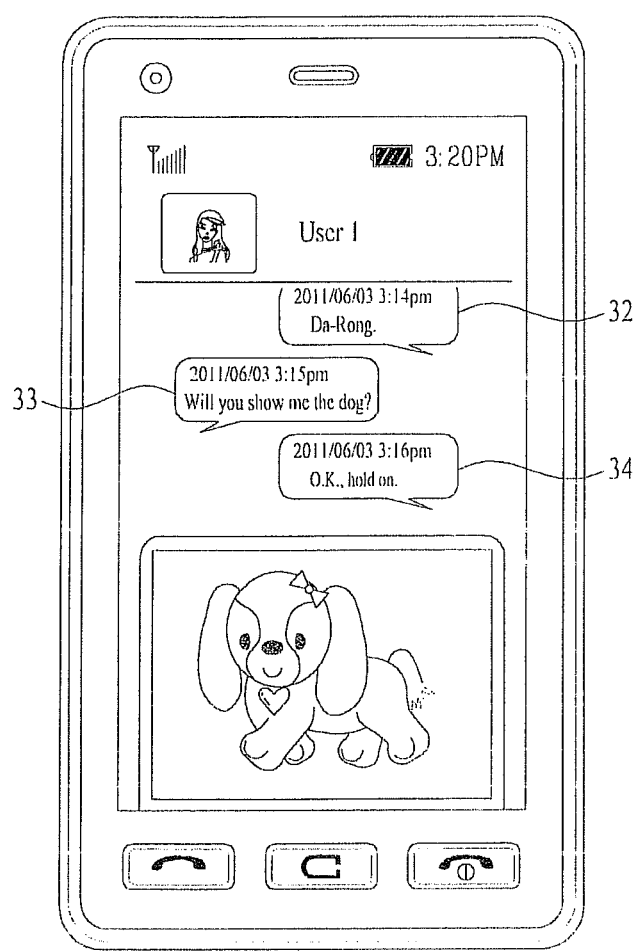
Figure 10C:
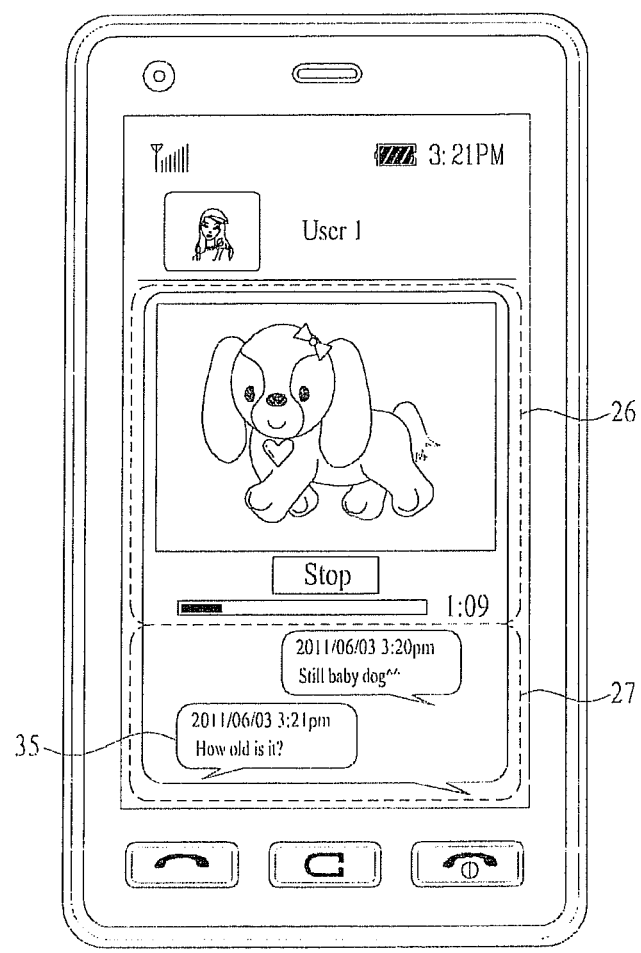
Figure 10D:
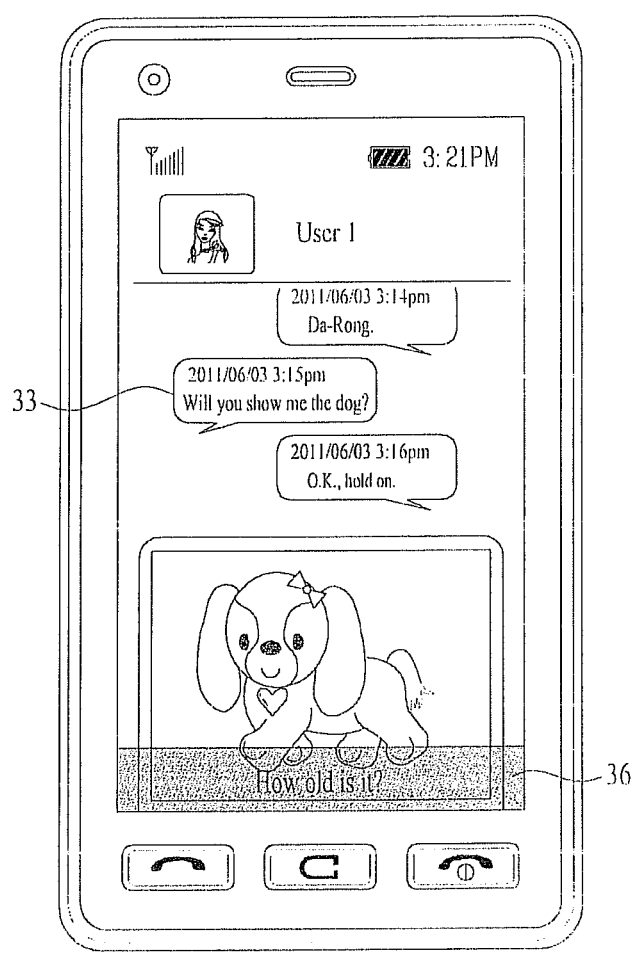

In the configuration shown in FIG. 10B, if a new message 35, which can be categorized into a $1^{st}$ type message, is transmitted or received, the controller 180 may control the real-time taken data to return to its original position and may control the new message 35 to be displayed on the $2^{nd}$ region 27 [FIG. 10C]. Alternatively, referring to FIG. 10D, while the real-time taken data is fixed to the bottom part of the display unit, the controller 180 may be able to control the content of the new message to be displayed via a semitransparent window 36.

The controller 180 may be able to control an output of the display unit to visually discriminate a $1^{st}$ type message and a $2^{nd}$ type message from each other. In particular, in order to visually discriminate a $1^{st}$ type message and a $2^{nd}$ type message from each other, various kinds of methods may be available.

For instance, referring to FIG. 9A and FIG. 10A, the controller 180 may be able to control the display unit 151 to display the real-time taken data and the $1^{st}$ type message tied together on one chat window 37. As the $1^{st}$ type message and the real-time taken data are outputted in a manner of being tied into one chat window, a user may be able to visually identify the $1^{st}$ type message and the $2^{nd}$ type message from each other through a boundary line of the chat window. Moreover, the controller 180 sorts the $1^{st}$ type messages into a transmitted message and a received message and may be then able to further control the transmitted message and the received message to be visually discriminated from each other.

According to another embodiment of the present invention, the controller 180 may be able to control the display unit 151 to identifiably display a message window of the $1^{st}$ type message and a message window of the $2^{nd}$ type message in a manner that the message windows of the $1^{st}$ and $2^{nd}$ type messages differ from each other in at least one of color, size, shape and pattern.

If a storage space of the memory 160 is insufficient, the casting mode in the external terminal is ended, or a prescribed user input is received, the controller 180 may be able to end the casting mode [S13]. For instance, if the stop button shown in FIG. 7A and FIG. 7B is pressed or the message application is ended, the controller 180 may be able to control the casting mode to be ended.

Once the casting mode is ended, the controller 180 stops recording the real-time taken data and may be then able to display a thumbnail image of the real-time taken data together with a play button. If a user presses the play button, the controller 180 may be able to play back the real-time taken data via the multimedia module 181.

In doing so, the $1^{st}$ message transmitted/received to/from the external terminal during the casting mode may be provided as a subtitle when the real-time taken data is played back. In particular, by converting the $1^{st}$ type message to a subtitle file, it may be able to check the $1^{st}$ type message transmitted/received to/from the external terminal in the course of relaying the real-time taken data when the real-time taken data is played back.

In order to display the $1^{st}$ type message as a subtitle, the controller 180 converts the $1^{st}$ type message to the subtitle file or processes the real-time taken data and the $1^{st}$ type message into a single file through encoding and may be then able to save the corresponding file in the memory 160 [S14].

Subsequently, the controller 180 may be able to upload the real-time taken data and the $1^{st}$ type message to an SNS site by interconnecting with the SNS site [S15]. In particular, the controller 180 accesses the SNS site periodically or asynchronously and may be then able to upload the real-time taken data and the $1^{st}$ type message to the accessed SNS site.

In doing so, the transmitted message transmitted to the external terminal among the $1^{st}$ type messages may be uploaded with a ID of a user of the mobile terminal, while the received message received from the external terminal among the $1^{st}$ type messages may be uploaded with a ID of a user of the external terminal.

Figure 11:
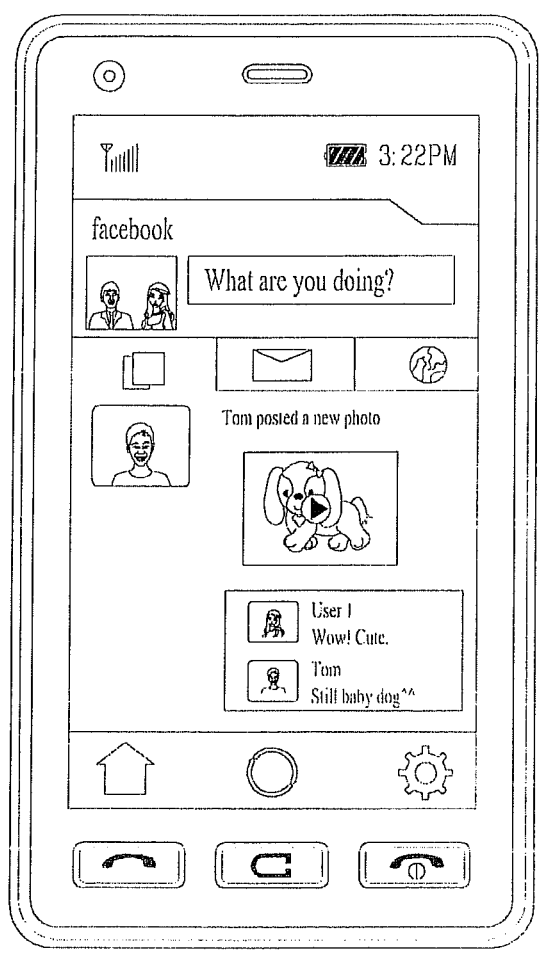
FIG. 11 is a diagram for one example of a screen for uploading real-time taken data and a $1^{st}$ type message to Facebook site.

FIG. 11 is a diagram for one example of a screen for uploading real-time taken data and a $1^{st}$ type message to Facebook site. First of all, a real-time taken data may be saved as a main frame on a posting and a $1^{st}$ type message may be provided as a comment on the posting.

In the above-mentioned description of the embodiment, as the casting mode is entered in the message application, the A/V input unit is activated, by which the embodiment may be non-limited.

Figure 12:
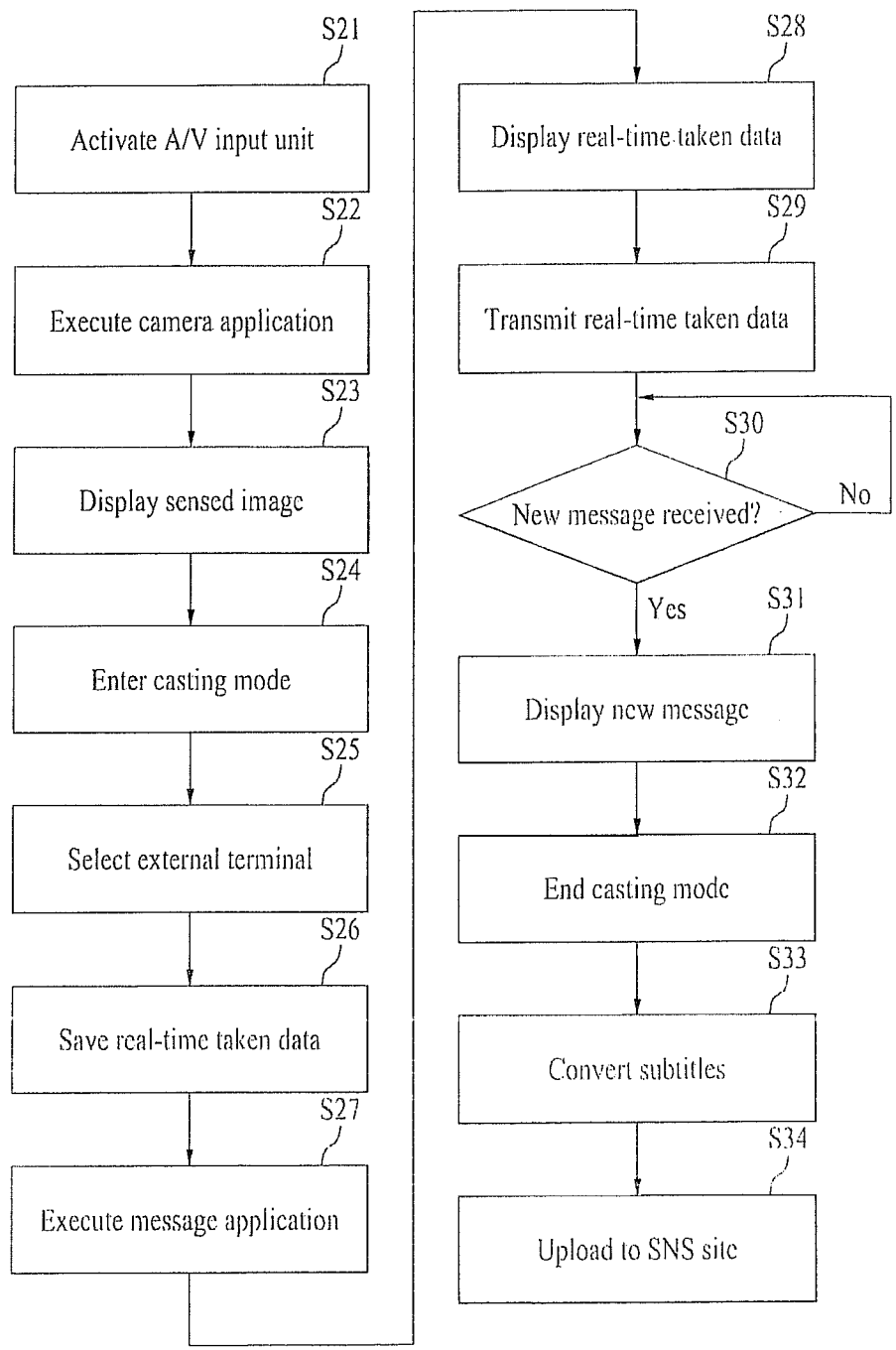
FIG. 12 is a flowchart for a method of controlling a mobile terminal according to another embodiment of the present invention.

FIG. 12 is a flowchart for a method of controlling a mobile terminal according to another embodiment of the present invention. Comparing FIG. 12 with FIG. 3, steps S28 to S34 shown in FIG. 12 may correspond to the former steps S9 to S15 shown in FIG. 3. Hence, details of the steps S28 to S34 shall be omitted from the following description. The differences between FIG. 12 and FIG. 3 are described as follows. First of all, the controller 180 activates the A/V input unit 120 based on an external input [S21] and executes the camera application [S22]. If the camera application is executed, the controller 180 may be able to display the image sensed by the camera and the menu screen 23, as described in the example shown in FIG. 6 [S23].

Figure 13A:
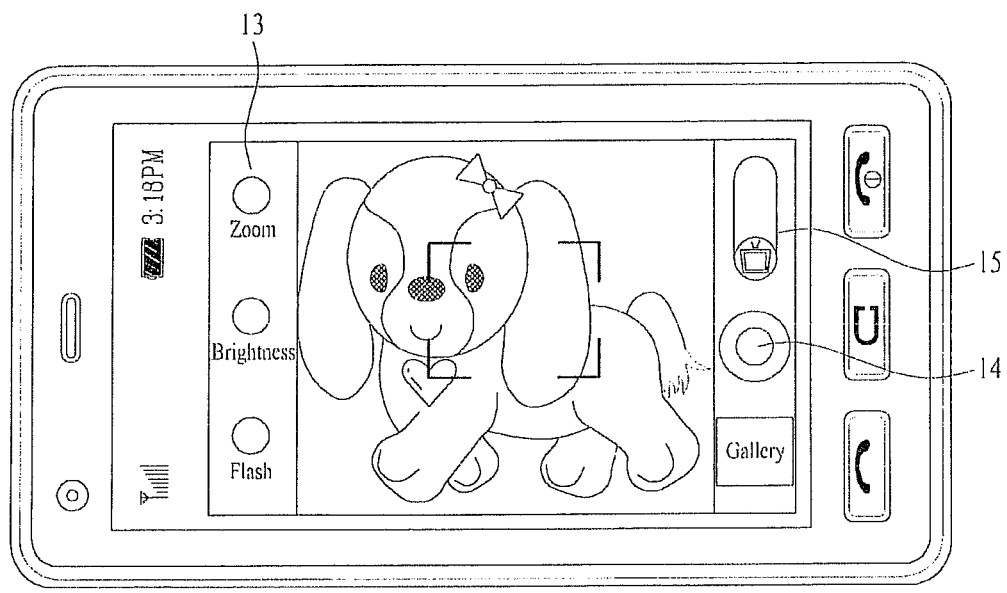
FIG. 13A and FIG. 13B are diagrams of screens provided to a user to enter a casting mode.
Figure 13B:
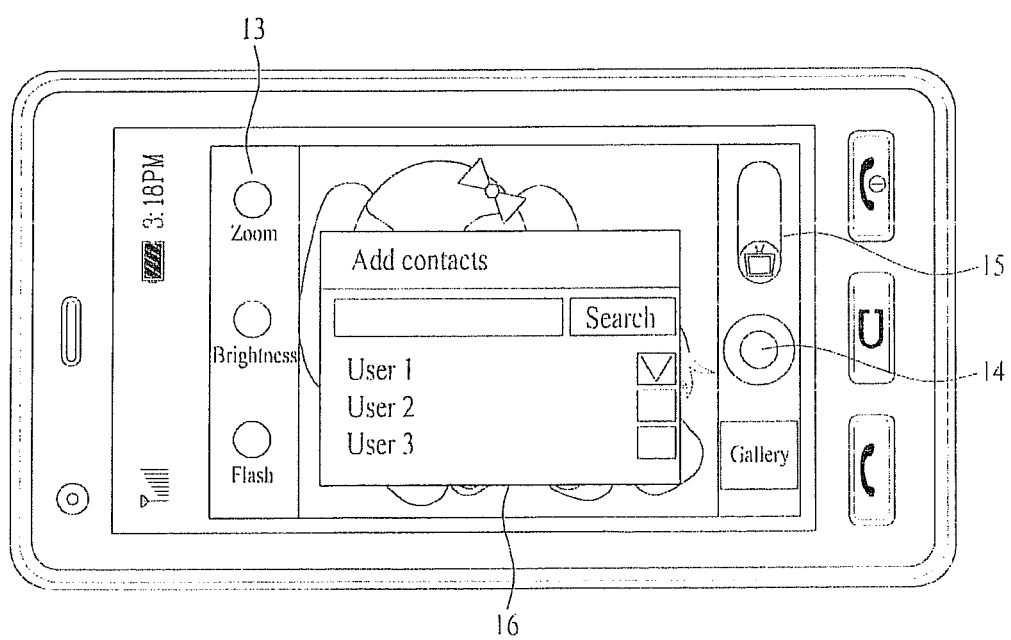

Based on a user input to the menu screen, the controller 180 may enter a casting mode [S24]. FIG. 13A and FIG. 13B are diagrams of screens provided to a user to enter a casting mode.

Referring to FIG. 13A, on a screen related to the camera application, a user enables a casting mode to be entered by such a method as a manipulation of a toggle key 15 and the like. In particular, FIG. 13A shows a screen that the casting mode can be entered in a manner that the toggle key 15 is pulled down to a bottom side.

Once the casting mode is entered, referring to FIG. 13B, the controller 180 provides a popup 16 for selecting an external terminal (particularly, a user of an external terminal or a phone number of an external terminal), to which a real-time taken data will be transmitted, to enable the user to select an external terminal to which the real-time taken data will be relayed [S25]. Once the external terminal is selected, the controller 180 converts an image inputted via the A/V input unit by real time into a real-time taken data and then saves the real-time taken data in the memory [S26]. And, the controller 180 may be able to control the wireless communication unit 110 to relay the real-time taken data to the selected external terminal.

The controller 180 executes the message application [S27] and then controls a screen related to the message application to be displayed, thereby providing the screen of the examples show in FIG. 8A and FIG. 8B.

In particular, although FIG. 3 shows that the casting mode can be set after executing the message application, FIG. 12 differs from FIG. 3 in that the casting mode can be set after executing the camera application in the first place.

Yet, the casting mode is entered through an input of the button provided by the message application or the camera application, by which the present invention may be non-limited. Alternatively, the present invention may include various modifications devised by those skilled in the art to which the present invention pertains.

In the above description of the embodiments, the display unit 151 is outputted in the portrait mode for example. Alternatively, the controller 180 may be able to control the display unit 151 to be outputted in a landscape mode. If the display unit 151 is set in the landscape mode, the controller 180 may be able to control a real-time taken data to be displayed on a full screen.

Figure 14A:
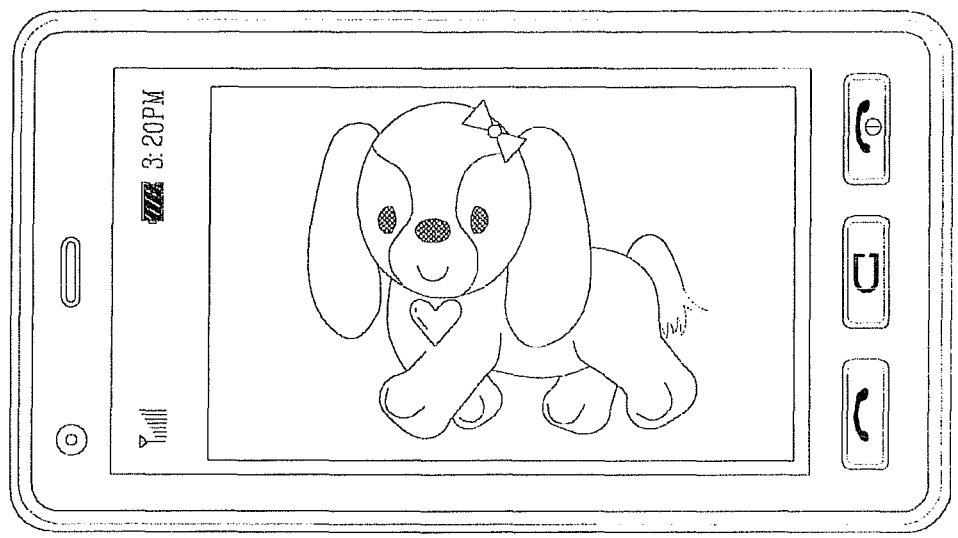
FIGS. 14A to 14C are diagrams for examples of screens for displaying real-time taken data on a full screen.
Figure 14B:
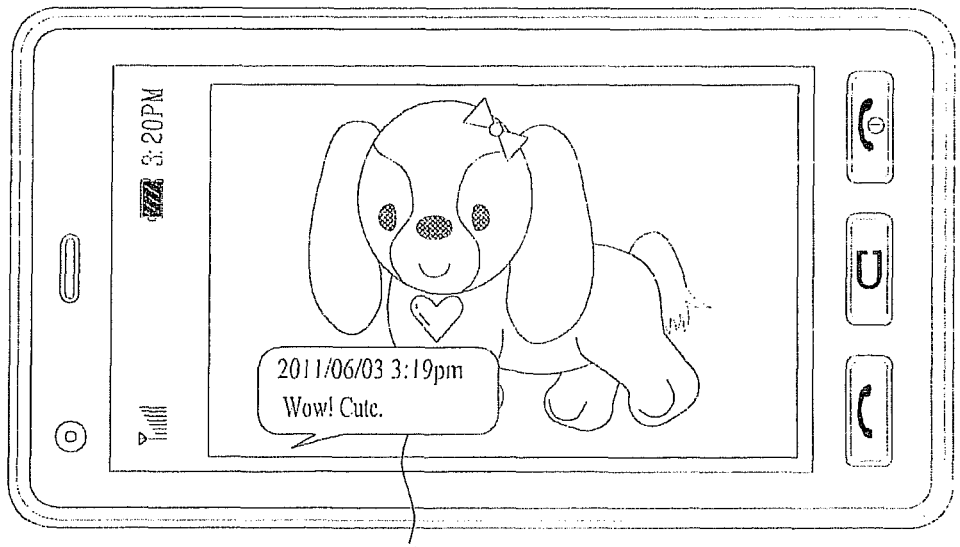
Figure 14C:
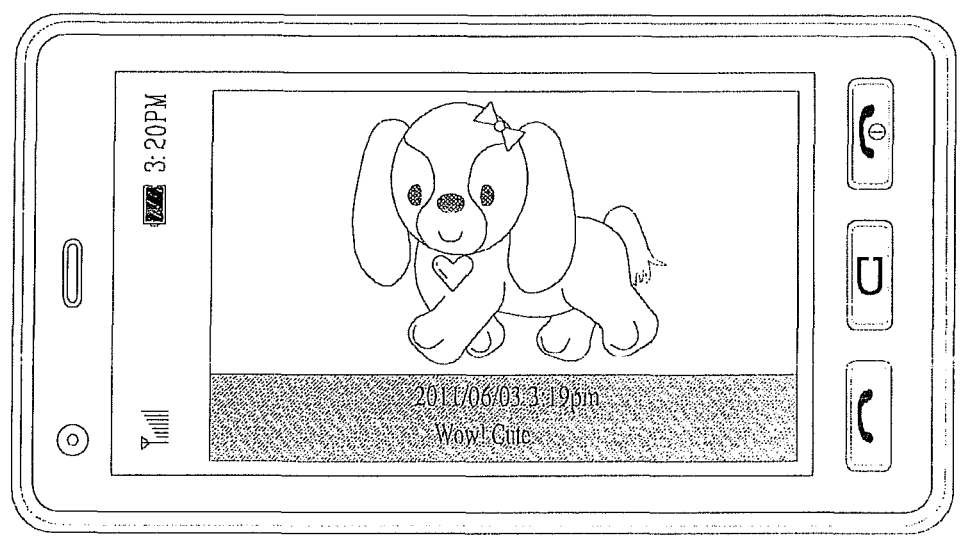

FIGS. 14A to 14C are diagrams for examples of screens for displaying real-time taken data on a full screen. Referring to FIG. 14A, the controller 180 may be able to control the display unit 151 to display a real-time taken data on a full screen. While the real-time taken data is being displayed on a full screen of the display unit 151, if a new message possibly categorized into a $1^{st}$ type message is received, referring to FIG. 14B, the controller 180 may be able to control an output of the display unit 151 to enable the new message to be outputted in a manner of overlapping with the real-time taken data. In doing so, the new message outputted by overlapping may be set to be displayable only for predetermined duration. Alternatively, referring to FIG. 14C, the controller is configured to reduce a size of a screen displaying the real-time taken data, thereby controlling the display unit to separately output the new message and the real-time taken data.

Moreover, the controller 180 converts a text content of the new message to an audio content and may output the audio content via a speaker of the audio output module 152.

While the real-time taken data is being displayed on a full screen, a user may be able to create a new message categorized into a $1^{st}$ type message through a virtual keypad or a speech.

In particular, the controller 180 outputs a virtual keypad in a manner that the outputted virtual keypad overlaps with the real-time taken data, thereby enabling a user to write or create a new message. In doing so, the virtual keypad may be set semi-transparent, whereby the real-time taken data can keep being displayed on the display unit 151 without being blocked by the virtual keypad.

The controller 180 converts audio data received from the A/V input unit 120 to a text and may be then able to create a new message from the corresponding text.

And, the controller 180 may be able to control the wireless communication unit 110 to transmit the new message created via the virtual keypad or the A/V input unit to an external terminal.

According to one embodiment of the present invention, the wireless communication unit 110 obtains location information of the mobile terminal 100 and may set a background image to a map corresponding to the location information. In particular, the wireless communication unit 110 may be able to obtain the location information of the mobile terminal via at least one of the mobile communication module 112, the wireless internet module 113 and the position location module 115.

Figure 15:
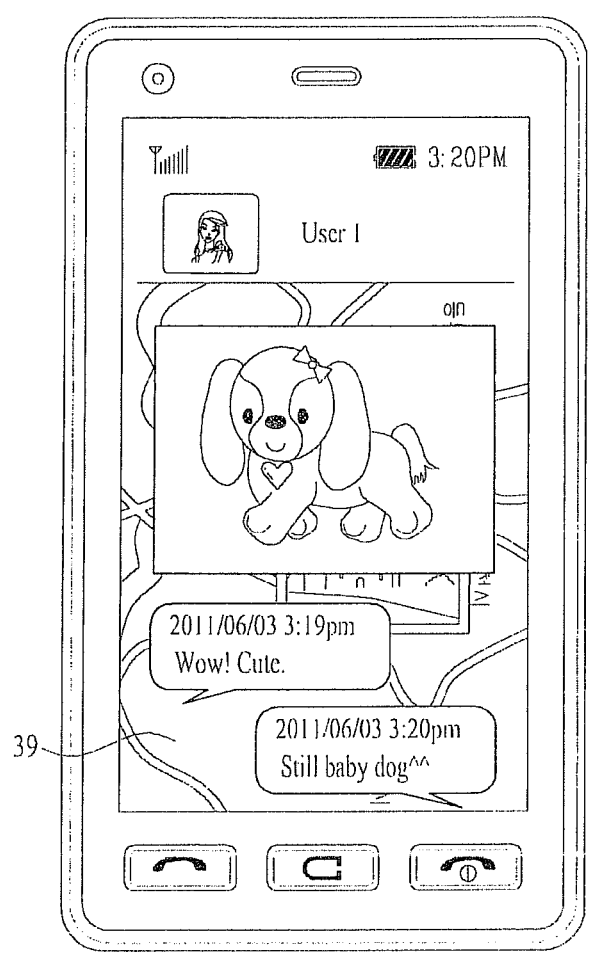
FIG. 15 is a diagram for one example of an output of a display unit for outputting real-time taken data in a status that a map is set as a background screen.

FIG. 15 is a diagram for one example of an output of a display unit for outputting real-time taken data in a status that a map is set as a background screen. Referring to FIG. 15, the controller 180 may be able to receive map data, which matches location information, from a map managing server (not shown in the drawing) via the wireless communication unit 110. Based on the received map data, the controller 180 may be able to control the display unit 151 to display a map matching the location information as a background image.

According to another embodiment of the present invention, the controller 180 may be able to control the wireless communication unit 110 to further transmit the location information, which is obtained via the wireless communication unit 110, to an external terminal. If the location information is transmitted to the external terminal, the external terminal may be able to set a background image to a map that matches the location information of the mobile terminal.

As the real-time taken data received from the mobile terminal is outputted having a map set as a background, a user of the external terminal may be able to conveniently obtain a geographical location and environment of the mobile terminal 100.

According to another embodiment of the present invention, the controller 180 may be able to control the wireless communication unit 110 to transmit a real-time taken data to a cloud server.

In particular, if a mobile terminal and an external terminal differ from each other in an operating system (OS) or the external terminal is unable to support a casting mode, the mobile terminal may enable the external terminal to receive a real-time taken data via a cloud server.

Figure 16:
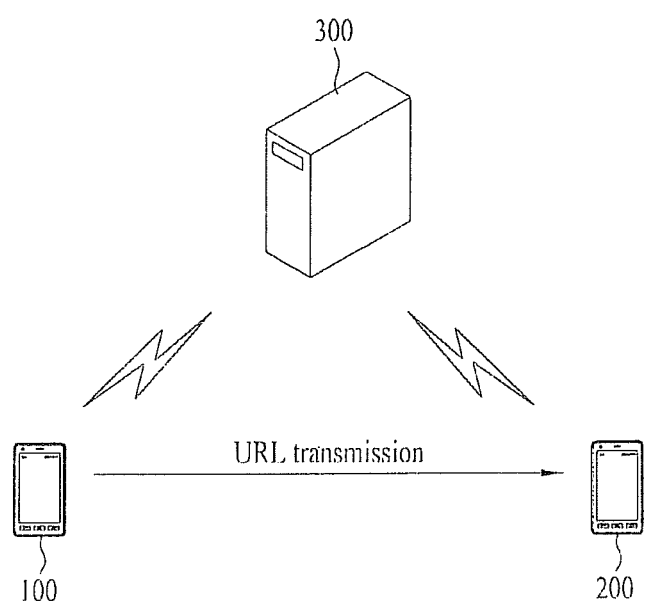
FIG. 16 is a diagram of configuration to describe that real-time taken data is transmitted to an external terminal via a cloud server.

FIG. 16 is a diagram of configuration to describe that real-time taken data is transmitted to an external terminal via a cloud server.

Referring to FIG. 16, the controller 180 of the mobile terminal 100 creates a real-time taken data based on an image inputted via the A/V input unit 120 and may control the wireless communication unit 110 to transmit the real-time taken data to a cloud server 300. The mobile terminal 100 acquires URL for accessing the real-time taken data from the cloud server 300 and may be then able to transmit the acquired URL address to an external terminal 200.

Subsequently, the external terminal 200 may be able to play back the real-time taken data, which is saved in the cloud server 300, by streaming via the URL address received from the mobile terminal 100. As the external terminal 200 plays back the real-time taken data saved in the cloud server 300 by streaming, the real-time taken data can be relayed to the external terminal 200.

In this case, a $1^{st}$ type message may be defined as a message exchanged with the external terminal while the real-time taken data is being transmitted to the cloud server. And, a $2^{nd}$ type message may be defined as a message (e.g., a message exchanged with the external terminal if the real-time taken data is not transmitted to the cloud server) except the $1^{st}$ type message.

The above embodiments may be described on the basis that a mobile terminal transmits a real-time taken data to an external terminal, by which the present invention may be non-limited. A mobile terminal may operate as 'a transmitting side mobile terminal' for transmitting a real-time taken data to an external terminal or 'a receiving side mobile terminal' for receiving the real-time taken data from the external terminal. In the following description, the details of operations of a receiving side mobile terminal shall be explained mainly with reference to a difference from a transmitting side mobile terminal. If there is no further or separate description, it is apparent that contents of the transmitting side mobile terminal described with reference to FIGS. 3 to 16 can be applied to the receiving side mobile terminal.

Figure 17:
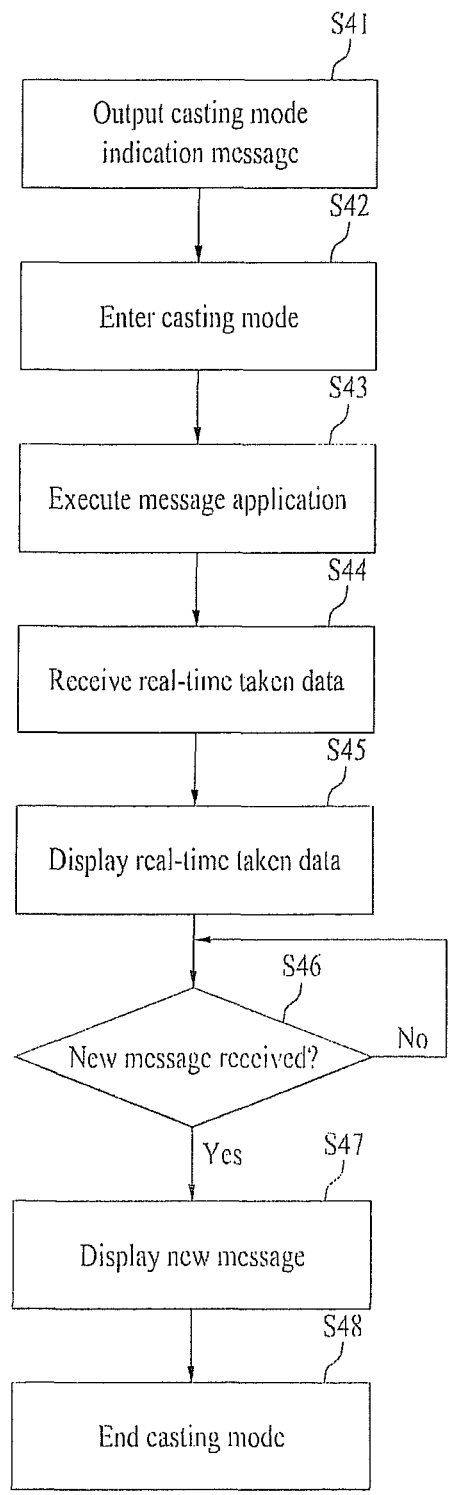
FIG. 17 is a flowchart for controlling a mobile terminal in case of receiving real-time taken data according to another embodiment of the present invention.

FIG. 17 is a flowchart for controlling a mobile terminal in case of receiving real-time taken data according to another embodiment of the present invention.

Referring to FIG. 17, if a casting request signal is received from an external terminal via the wireless communication unit 110, the controller 180 may be able to output a casting mode indication message to the display unit 151 [S41].

Figure 18:
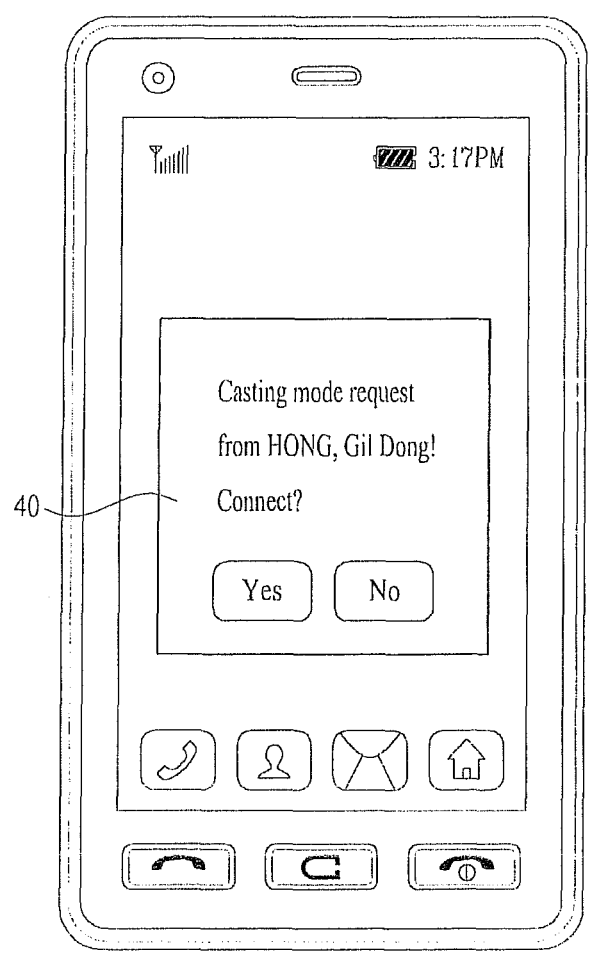
FIG. 18 is a diagram for one example of a screen having a casting mode indication message displayed thereon.

FIG. 18 is a diagram for one example of a screen having a casting mode indication message displayed thereon.

Referring to FIG. 18, if a casting mode request signal is received from an external terminal, the controller 180 outputs a casting mode indication message 40 to enable a user to select whether a casting mode is entered.

If the casting mode is entered based on the user input [S42], the controller 180 executes the message application [S43], receives a real-time taken data from the external terminal [S44] and then controls the real-time taken data to be displayed on the display unit 151 [S45]. In this case, the received real-time taken data may be saved in the memory 160 temporarily or permanently.

Figure 19A:
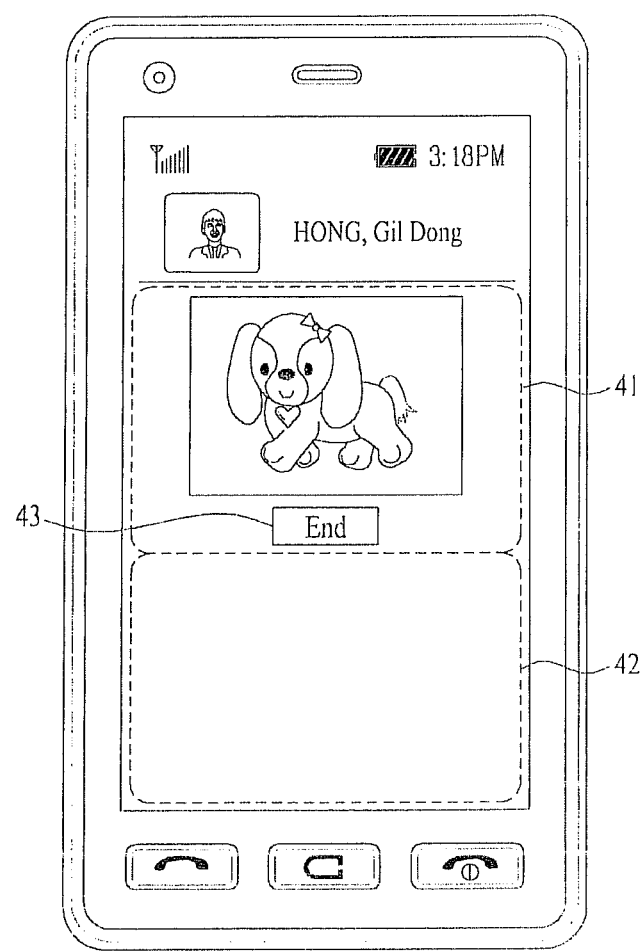
FIG. 19A and FIG. 19B are diagrams for examples of screen configuration in case that a mobile terminal receives real-time taken data.
Figure 19B:

FIG. 19A and FIG. 19B are diagrams for examples of screen configuration in case that a mobile terminal receives real-time taken data. Referring to FIG. 19A, the controller 180 may output a real-time taken data on a $1^{st}$ region 41 of the display unit and may leave a $2^{nd}$ region 42 as an empty screen. In doing so, a button 43 for ending a casting mode may be provided together with the real-time taken data. If a new message categorized into a $1^{st}$ type message is received, the controller 180 may be able to display the new message on the $2^{nd}$ region. Compared to FIG. 7A, FIG. 19A shows that a progressing bar 20 may not be provided, which is not mandatory.

Referring to FIG. 19B, before the casting mode is entered with a real-time taken data, the controller 180 may be able to display the real-time taken data together with a message (e.g., a message categorized into a $2^{nd}$ type message) exchanged with an external terminal.

A display size of a real-time taken data displayed on a receiving side mobile terminal may be set smaller than that of the real-time taken data displayed on a transmitting side mobile terminal. As the display size of the real-time taken data is set smaller than that of the real-time taken data of the transmitting side mobile terminal, more messages can be checked at a glance.

While the real-time taken data is being displayed, if a new message possibly categorized into the $1^{st}$ type message is received [S46], the controller 180 may be able to control the new message to be displayed on a $2^{nd}$ region different from the $1^{st}$ region [S47].

Figure 20:
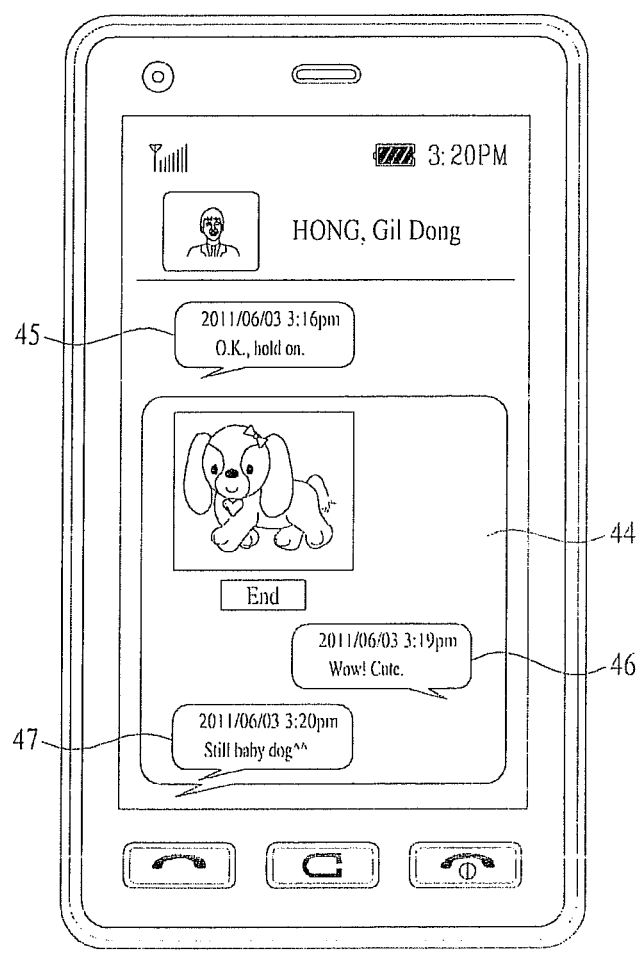
FIG. 20 is a diagram for one example of a screen for discriminating a $1^{st}$ type message and a $2^{nd}$ type message from each other.

FIG. 20 is a diagram for one example of a screen for discriminating a $1^{st}$ type message and a $2^{nd}$ type message from each other. Referring to FIG. 20, the controller 180 controls the display unit to output a real-time taken data and a $1^{st}$ type message in a manner that the real-time taken data and the $1^{st}$ type message are tied into one chat window 44, whereby first type messages 46 and 47 can be discriminated from a $2^{nd}$ type message 45.

If the casting mode is ended in the external terminal of a user input is received (e.g., a user presses the end button 43), the controller 180 may be able to end the casting mode [S48].

If the casting mode is ended, the controller 180 deletes the real-time taken data saved in the memory 160 or may set the real-time taken data to be saved as a video file in the memory 160.

In case that the real-time taken data is deleted, the controller 180 may be able to display a last picture of the real-time taken data. In case that the real-time taken data is saved as the video file in the memory 160, the controller 180 may display a thumbnail image of the real-time taken data together with a play button.

Figure 21:
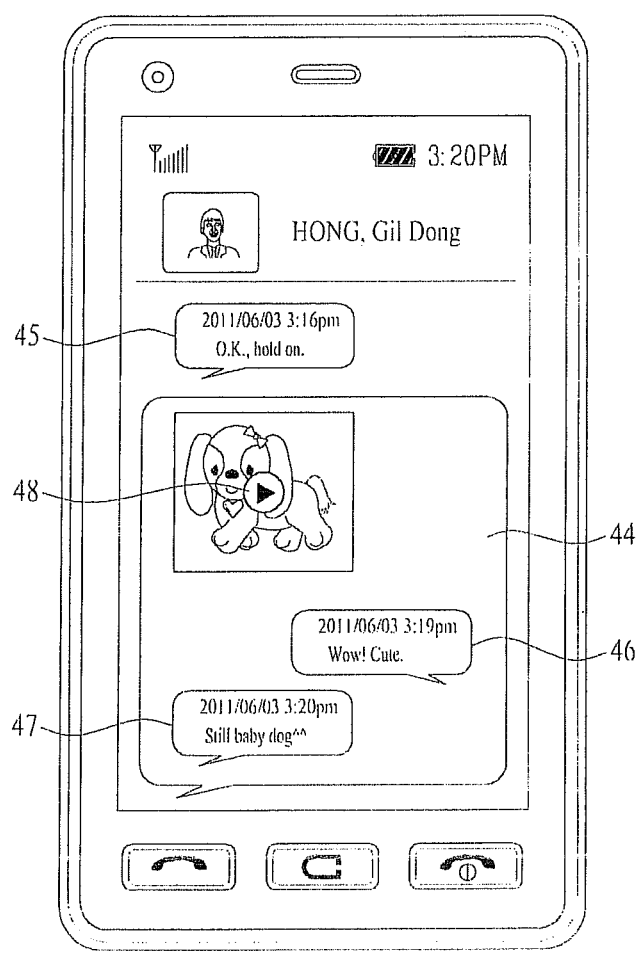
FIG. 21 is a diagram for one example of a screen at the end of a casting mode is ended.

FIG. 21 is a diagram for one example of a screen at the end of a casting mode is ended.

Referring to FIG. 21, if a real-time taken data is saved as a video file in the memory 160, the controller 180 may be able to provide a thumbnail image of the real-time taken data together with a play button 48. If a user presses the play button 48, the controller 180 may be able to play back the real-time taken data via the multimedia module 181.

After the casting mode has been ended, if a new message possibly categorized into a $2^{nd}$ type message is received, the controller 180 may be able to display the new message to be visually discriminated from a $1^{st}$ type message.

Figure 22:
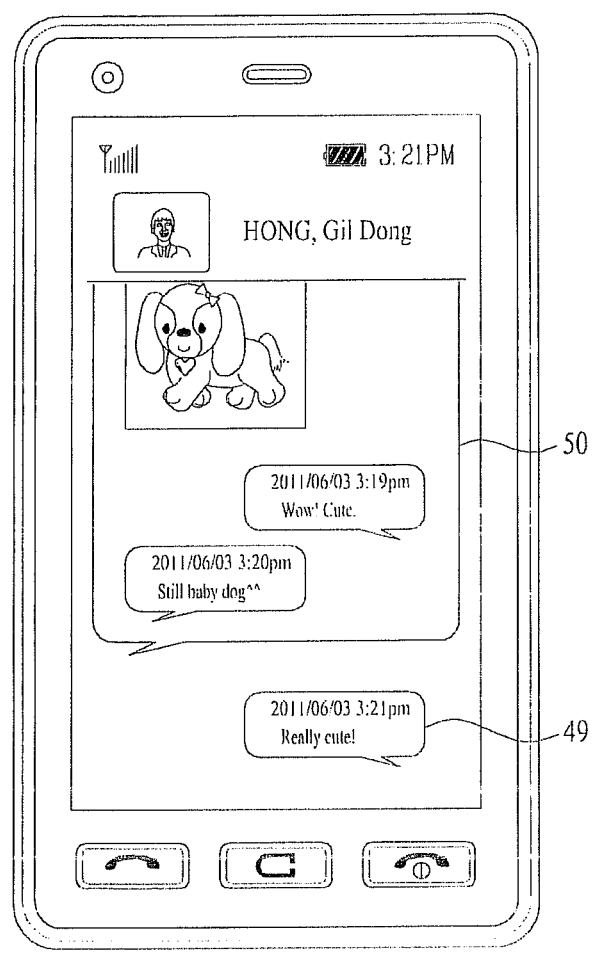
FIG. 22 is a diagram for one example of a screen for a reception of a new message after end of a casting mode.

FIG. 22 is a diagram for one example of a screen for a reception of a new message after end of a casting mode.

Referring to FIG. 22, as a new message 49 possible categorized into a $2^{nd}$ type message is displayed outside a chat window 50 having a $1^{st}$ type message belong thereto, the $1^{st}$ type message and the $2^{nd}$ type message can be visually discriminated from each other on a boundary of the chat window 50.

According to the above embodiments, a $1^{st}$ type message is defined as a message exchanged with an external terminal while a real-time taken data is being transmitted/received to/from the external terminal. And, a $2^{nd}$ type message is explained as a message except the $1^{st}$ type message. For example, the $2^{nd}$ type message includes one of a message transceived with the external terminal in the course of not transmitting/receiving real-time taken data to/from the external terminal, a message transceived with another external terminal and the like. Yet, this may non-limit the $1^{st}$ type message and the $2^{nd}$ type message.

Besides, the message categorization with reference to the real-time taken data may come within the scope of the appended claims and their equivalents. For instance, $1^{st}$ and $2^{nd}$ type messages can be categorized by various real-time taken data based methods including a method of defining a $1^{st}$ type message as a message transceived with an external terminal in the course of displaying a real-time taken data, a method of defining a $1^{st}$ type message as a message transceived with an external terminal in the course of outputting an image sensed via the A/V input unit to a display before a relay of an external terminal, a method of defining a $1^{st}$ type message as a message transceived with an external terminal in the course of displaying a thumbnail of a real-time taken data after an end of a casting mode, a method of defining a $1^{st}$ type message as a message transceived with an external terminal in the course of playing a real-time taken data after a casting mode end, a method of defining a $1^{st}$ type message as a message transceived with an external terminal in the course of transmitting a real-time taken data to a cloud server, a method of configuring a $1^{st}$ type message by combining the above-enumerated items together and the like.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The above-described mobile terminal may be achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a camera configured to film a real-time video;
a display unit configured to display the real-time video;

a wireless communication unit configured to communicate with an external terminal;
a memory configured to store the real-time video; and
a controller configured to:
- activate the camera during communication with the external terminal in order to film the real-time video; and
- control the wireless communication unit to transmit the real-time video to the external terminal in order to share the real-time video with the external terminal, wherein when sharing the real-time video with the external terminal is initiated, the controller is configured to control the display unit to be divided into a first region and a second region so that the real-time video is fixedly displayed on the first region of the display unit and a first message and a second message are displayed on the second region of the display unit, wherein when sharing the real-time video with the external terminal is ended, the controller is configured to control the display unit to stop being divided into the first region and the second region and control the real-time video, and the first and second messages to be displayed in order of time, wherein the controller is further configured to control the display unit to visually distinguish the first message exchanged during the communication with the external terminal and the second message exchanged during the communication with the external terminal, and wherein the first message is exchanged during the sharing of the real-time video with the external terminal, and the second message is exchanged before or after the sharing of the real-time video with the external terminal.

2. The mobile terminal of claim 1, wherein when a portion of the real-time video is removed from the first region of the display unit, the controller controls the display unit such that the real-time video is automatically moved to a different position on the display unit that is spaced apart from a boundary of the first region by a prescribed distance.

3. The mobile terminal of claim 2, wherein when a new message categorized as the first message is received at the mobile terminal, the controller controls the real-time video to be provided back to the first region of the display unit.

4. The mobile terminal of claim 1, wherein when a new message categorized as the first message is transmitted from the mobile terminal or is received by the mobile terminal, the controller controls the display unit to display the new message such that the new message overlaps with the real-time video displayed on a full screen.

5. The mobile terminal of claim 1, wherein the wireless communication unit is further configured to transmit a location information of the mobile terminal to the external terminal.

6. The mobile terminal of claim 1, wherein the controller is further configured to control the wireless communication unit to transmit the real-time video to a cloud server.

7. The mobile terminal of claim 6, wherein the controller is further configured to control the wireless communication unit to transmit a URL address for accessing the real-time video stored in the cloud server to the external terminal.

8. A method of controlling a mobile terminal, comprising:
activating a camera during a communication with an external terminal in order to film a real-time video;
transmitting the real-time video to the external terminal in order to share the real-time video with the external terminal; and
displaying a first message and a second message exchanged during the communication with the external terminal, and
wherein the first message is exchanged during the sharing of the real-time video with the external terminal, and the second message is exchanged before or after the sharing of the real-time video with the external terminal,
wherein when sharing the real-time video with the external terminal is initiated, the method further comprises dividing a display unit into a first region and a second region so that the real-time video is fixedly displayed on the first region of the display unit and the first message and the second message are displayed on the second region of the display unit,
wherein when sharing the real-time video with the external terminal is ended, method further comprises stop dividing the display unit into the first region and the second region and then displaying the real-time video, and the first and second messages in order of time.

* * * * *